United States Patent
Rahman et al.

(10) Patent No.: US 7,606,178 B2
(45) Date of Patent: Oct. 20, 2009

(54) MULTIPLE WIRELESS SPANNING TREE PROTOCOL FOR USE IN A WIRELESS MESH NETWORK

(75) Inventors: Shahriar I. Rahman, Morgan Hill, CA (US); Jan Kruys, Amsterdam (NL); Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 554 days.

(21) Appl. No.: 11/351,853

(22) Filed: Feb. 10, 2006

(65) Prior Publication Data

US 2006/0268749 A1    Nov. 30, 2006

Related U.S. Application Data

(60) Provisional application No. 60/686,235, filed on May 31, 2005.

(51) Int. Cl.
*H04L 12/28* (2006.01)
(52) U.S. Cl. .................. 370/256; 370/395.31; 370/408; 455/445
(58) Field of Classification Search .................. 370/256, 370/395.31, 395.5, 408, 254, 255, 328, 395.21, 370/395.53, 338, 389; 455/403, 445, 452.2
See application file for complete search history.

(56) References Cited

U.S. PATENT DOCUMENTS

| | | | |
|---|---|---|---|
| 5,295,154 A | 3/1994 | Meier et al. ..................... 375/1 |
| 5,394,436 A | 2/1995 | Meier et al. .................. 375/202 |
| 5,428,636 A | 6/1995 | Meier ........................... 375/202 |
| 5,504,746 A | 4/1996 | Meier ....................... 370/85.13 |
| 5,673,031 A | 9/1997 | Meier .................... 340/825.08 |
| 5,740,366 A * | 4/1998 | Mahany et al. ............... 709/227 |
| 5,748,619 A | 5/1998 | Meier .......................... 370/278 |
| 5,790,536 A | 8/1998 | Mahany et al. ............... 370/338 |
| 5,940,771 A | 8/1999 | Gollnick et al. .............. 455/517 |
| 6,032,194 A | 2/2000 | Gai et al. ...................... 709/239 |

(Continued)

FOREIGN PATENT DOCUMENTS

JP    2000124937 A  *  4/2000

OTHER PUBLICATIONS

"Understanding Rapid Spanning Tree Protocol (802.1w)"; Cisco; Updated Oct. 24, 2006; ID: 24062; URL: http://www.cisco.com/en/US/tech/tk389/tk621/technologies_white_paper09186a0080094cfa.shtml.*

(Continued)

*Primary Examiner*—Aung S Moe
*Assistant Examiner*—Benjamin Elliott
(74) *Attorney, Agent, or Firm*—Dov Rosenfeld; Inventek

(57) ABSTRACT

An apparatus for, a method of, and a computer carrier medium carrying code to cause a processor to execute a method. The method includes running a plurality of instances of a wireless spanning tree protocol in a wireless mesh node, each instance substantially conforming to the IEEE 802.1 standard. Running an instance of wireless spanning tree protocol including the wireless mesh point wirelessly transmitting BPDU information to other wireless mesh points of the network or wirelessly receiving BPDU information from other wireless mesh points, the BPDU information encapsulated in one or more control/management frames, e.g., beacon or probe response frames of a wireless network standard, the BPDU information relating to a spanning tree topology for the instance.

61 Claims, 6 Drawing Sheets

U.S. PATENT DOCUMENTS

| | | | | |
|---|---|---|---|---|
| 6,046,992 | A | 4/2000 | Meier et al. | 370/338 |
| 6,084,867 | A | 7/2000 | Meier | 370/338 |
| 6,188,694 | B1 | 2/2001 | Fine et al. | 370/402 |
| 6,330,229 | B1 | 12/2001 | Jain et al. | 370/256 |
| 6,374,311 | B1 | 4/2002 | Mahany et al. | 710/18 |
| 6,400,702 | B1 | 6/2002 | Meier | 370/338 |
| 6,407,991 | B1 | 6/2002 | Meier | 370/338 |
| 6,535,490 | B1 | 3/2003 | Jain | 370/256 |
| 6,611,502 | B1 * | 8/2003 | Seaman | 370/256 |
| 6,678,241 | B1 | 1/2004 | Gai et al. | 370/216 |
| 6,701,361 | B1 | 3/2004 | Meier | 709/224 |
| 6,714,559 | B1 | 3/2004 | Meier | 370/449 |
| 6,714,983 | B1 | 3/2004 | Koenck et al. | 709/230 |
| 6,757,298 | B1 | 6/2004 | Burns et al. | 370/473 |
| 6,771,610 | B1 | 8/2004 | Seaman | 370/256 |
| 6,795,403 | B1 | 9/2004 | Gundavelli | 370/256 |
| 6,826,165 | B1 | 11/2004 | Meier et al. | 370/338 |
| 6,847,620 | B1 | 1/2005 | Meier | 370/328 |
| 6,891,808 | B2 | 5/2005 | Ishii | 370/256 |
| 6,895,450 | B2 | 5/2005 | Mahany et al. | 710/18 |
| 6,937,576 | B1 * | 8/2005 | Di Benedetto et al. | 370/256 |
| 2003/0112810 | A1 * | 6/2003 | Nakabayashi et al. | 370/401 |
| 2003/0142680 | A1 * | 7/2003 | Oguchi | 370/400 |
| 2004/0081171 | A1 * | 4/2004 | Finn | 370/395.53 |
| 2004/0103275 | A1 | 5/2004 | Ji et al. | 713/150 |
| 2004/0103282 | A1 * | 5/2004 | Meier et al. | 713/171 |
| 2004/0250634 | A1 * | 12/2004 | Liu et al. | 73/863.22 |
| 2005/0013260 | A1 | 1/2005 | Ramanathan et al. | 370/256 |
| 2005/0066166 | A1 | 3/2005 | Chin et al. | 713/165 |
| 2005/0163102 | A1 * | 7/2005 | Higashitaniguchi et al. | 370/351 |
| 2005/0213515 | A1 | 9/2005 | Wakumoto et al. | 370/254 |
| 2005/0243757 | A1 * | 11/2005 | Yagyu et al. | 370/328 |
| 2005/0259597 | A1 * | 11/2005 | Benedetto et al. | 370/254 |
| 2006/0182076 | A1 * | 8/2006 | Wang | 370/338 |
| 2007/0064673 | A1 * | 3/2007 | Bhandaru et al. | 370/351 |
| 2007/0230338 | A1 * | 10/2007 | Shao et al. | 370/230 |
| 2007/0258359 | A1 * | 11/2007 | Ogasawara et al. | 370/218 |
| 2007/0280184 | A1 * | 12/2007 | Shin et al. | 370/338 |
| 2008/0192691 | A1 * | 8/2008 | Park et al. | 370/331 |

OTHER PUBLICATIONS

R. Chandra, C. Fetzer and K. Hogstedt, "A Mesh based Robust Topology Discovery Algorithm for Hybrid Wireless Networks", AT&T Labs Tech Report, AT&T Research Laboratories, Techical Report, 2002.

E. Royer and C. Toh, "A Review of Current Routing Protocols for Ad-Hoc Mobile Wireless Networks", IEEE Personal Communications, Apr. 1999.

R. Chandra, C. Fetzer, K. Hogstedt, "Adaptive Topology Discovery in Hybrid Wireless Networks", Proceedings of Informatics, 1st International Conference on Ad-hoc Networks and Wireless, Toronto, vol. 16, pp. 1-16, Sep. 20-22, 2002.

"Understanding Multiple Spanning Tree Protocol (802.1s)," White Paper (Document ID: 24248), Cisco Systems, Inc., San Jose, California, downloaded on Jan. 9, 2006 as URL <http://www.cisco.com/warp/public/473/147.pdf>.

"Resource Reservation Protocol", Chapter 48, *Internetworking Technologies Handbook*, Cisco Systems, Inc., San Jose, California, downloaded on Feb. 2, 2006 from http://www.cisco.com/univercd/cc/td/doc/cisintwk/ito_doc/index.htm.

PCT International Preliminary Report on Patentability on PCT Application PCT/US2006/015880.

* cited by examiner

MULTIPLE WIRELESS SPANNING TREE PROTOCOL FOR USE IN A WIRELESS MESH NETWORK

RELATED PATENT APPLICATIONS

This invention claims benefit of U.S. Provisional Patent Application Ser. No. 60/686,235, filed May 31, 2005 to inventors Rahman et al., titled SPANNING TREE PROTOCOL FOR WIRELESS NETWORKS. The contents of such U.S. Provisional Patent Application Ser. No. 60/686,235 are incorporated herein by reference.

This invention is related to concurrently filed U.S. patent application Ser. No. 11/351,433 to inventors Rahman et al., titled "A SPANNING TREE PROTOCOL FOR WIRELESS NETWORKS,", Assigned to Cisco Technology, Inc., the assignee of the present invention. U.S. patent application Ser. No. 11/351,433 also claims benefit of U.S. Provisional Patent Application Ser. No. 60/686,235. The contents of such U.S. patent application Ser. No. 11/351,433 are incorporated herein by reference, the invention(s) described therein are herein called the "WSTP Invention" and that Application called the "WSTP Application" herein.

BACKGROUND

The present invention is related to wireless networks, and in particular to a spanning tree protocol for use with an ad-hoc wireless network to avoid loops in the wireless network.

In the area of local area networks (LANs), and in particular, LAN bridges, spanning tree protocols are known for preventing loops in a bridged (typically wired) network. In particular, the Institute of Electrical and Electronics Engineers (IEEE) has developed a network communication standard IEEE 802.1d entitled, "Media Access Control (MAC) Bridges," originally approved May 31, 1990 (hereinafter "IEEE 802.1d"), and also high-speed (IEEE 802.1w) and high-density (IEEE 802.1s) counterparts. Any of these protocols, and also a collection of these standard protocols is/are referred to herein as the "standard IEEE 802.1 spanning tree protocol." In brief, the standard IEEE 802.1 protocol describes functions to be performed by a compliant bridge including maintaining the spanning tree topology for the bridge, building and maintenance of a filtering database, relaying and filtering of frames, and transmission of Bridge Protocol Data Units (BPDUs). A BPDU is a special message that bridges transmit to each other to facilitate determination of a spanning tree topology.

Wireless networks are becoming widespread. For example, wireless local area networks (WLANs) that conform to the IEEE 802.11 standard are becoming more and more popular. One way of operating a WLAN is in infrastructure mode according to which some wireless stations operate as access points, and each access point has client stations. All communication from and to a client station is via its access point. WLANS may also operate in ad-hoc mode according to which any station may communicate directly with any other station. Such a wireless network forms a mesh. The present invention is particularly applicable to such mesh wireless networks where, as in a wired mesh, any station could have a wireless link to another station. Such a network is also called a multi-hop wireless network herein.

The standard IEEE 802.1 spanning tree protocol was originally designed to work over wired Ethernet links and cannot operate until the low-level links are established. In wireless networks such as IEEE 802.11 networks, low-level link establishment is a multi-step process. The blocking/tearing down of established links by a spanning tree process such as used in a wired network may be undesirable. Thus, the standard IEEE 802.1 spanning tree protocol as designed cannot simply operate in a wireless network environment.

Implementations of the IEEE 802.1 spanning tree algorithms are common. It is desirable to not have to modify existing protocol stacks at end stations. Furthermore, it is desirable to not have to modify existing protocol stacks, such as mobile in ad-hoc mobile protocols (MANET protocols) and L3 routing logic in intermediate devices, common in Mobile-IP protocols.

It further is desirable to have a wireless spanning tree algorithm that avoids temporary loops. Temporary loops can be a problem in a bridged, multi-hop wireless network, often resulting in dramatically rapid packet proliferation through the network.

Described in the WSTP Application is how to operate, in a wireless network such as an IEEE 802.11-conforming network, a spanning tree protocol called WSTP (for wireless spanning tree protocol) herein, that substantially conforms to the standard IEEE 802.1 spanning tree protocol. By substantially conform we mean conforming to, including the extensions and modification in the WSTP Application and herein. The description in the WSTP Application is provided in terms of an IEEE 802.11 conforming network. WSTP is applicable to operations in a wireless standard that provides a mechanism for wireless stations to wirelessly communicate with other wireless stations using control/management frames for wireless network information, e.g., to transmit beacon or probe response frames to advertise the characteristics of the transmitting wireless station. The WSTP Application describes how in a wireless mesh network that includes a single portal, where by a portal is meant a node that has a connection (an uplink) to another network such as a LAN, WAN, e.g., the Internet, or a Satellite link, a spanning tree topology is formed in which the portal is the wireless bridging entity that forms the root of the tree. Wireless nodes that act as bridging nodes, called wireless Dbridges herein, advertise their spanning tree topology properties in the form of one or more bridge protocol data units (BPDUs) forming BPDU Information encapsulated in control/management frames, e.g., beacon and probe responses frames. The BPDU Information substantially conforms to standard IEEE 802.1 spanning tree protocol BPDU information and includes radio data. A wireless Dbridge advertises that it is a wireless Dbridge, i.e., that is WSTP-capable by sending management frames such as beacon frames that have a pre-defined field, called the "WSTP Capability" field herein, set to "true." Other features of WSTP are described in the WSTP Application, and also herein below.

In a typical 802.11 mesh network, there are likely to be several, even many portals. In such a case, it may be preferable to run several instances of the wireless spanning tree protocol to generate several spanning tree topologies for scalability, with each portal forming a root bridge for a spanning tree topology of wireless Dbridges. Moreover, in order to provide the needed Quality of Service (QoS) and to provide for multicasting, it may be desirable to run several instances of the wireless spanning tree protocol to generate several tree topologies, all having the same portal as the root mesh point.

Thus there is a need in the art for a method and apparatus for running a mesh network that includes a running a plurality of instances of wireless spanning tree protocol in a wireless mesh network to generate a corresponding plurality of tree protocols. Some of the plurality of wireless spanning tree topologies may run laterally, meaning that the tree topologies run on different sets of devices, each one root mesh point, e.g., a portal device. Connecting the portal devices forms a mesh network of mesh networks.

In an alternate configuration, a plurality of wireless spanning tree protocol instances run on the same device to generate a corresponding plurality of topologies that have the same root bridge. The instances each has a different path cost metric. We call such a set of multiple wireless spanning tree topologies from running multiple wireless spanning tree protocol instances an overlaid network configuration. Such an overlaid network configuration provides for different quality of service QoS and for efficient multicasting per tree protocol.

Thus there is a need in the art for operating a wireless mesh network with an overlay wireless spanning tree protocol mechanism that greatly enhances the ability of differentiating different traffic classes in a mesh network, and that is able to provide pre-defined end-to-end quality of service (QoS) for each such class.

There further is a need in the art for so using a wireless spanning tree protocol in a scalable manner, with the scaling being flexible to suit different network and application requirements.

There also is a need in the art for operating a mesh network with an overlay wireless spanning tree protocol mechanism that provides for easily and effectively incorporating 802.11e QoS enhancements into the wireless spanning tree protocol.

There also is a need in the art for an overlay mechanism that significantly increases the efficiency of multicast forwarding in a mesh network and that re-uses existing multicasting protocols and methods whenever appropriate.

SUMMARY

Described herein is a method of running, e.g., in a wireless mesh point of a wireless network, a plurality of instances of a wireless spanning tree protocol that substantially conforms to the standard IEEE 802.1 spanning tree protocol. Such a substantially conforming wireless spanning tree protocol is referred to as WSTP herein, and described in detail in the WSTP Application. Each instance is therefore referred to as a WSTP instance.

Also described herein is a wireless network entity acting as a mesh point that runs a plurality of WSTP instances.

One aspect is a method in a first mesh point of a mesh of wireless mesh points in a wireless network. The wireless network substantially conforms to a wireless network standard that provides control/management frames for network entities to exchange wireless network information with one or more other wireless network entities. As an example, the wireless network standard provides a mechanism for wireless network entities to wirelessly communicate wireless network information using control/management frames, e.g., to transmit beacon or probe response frames to other wireless network entities to advertise the radio characteristics of the wireless network entity. An example, but not the only example, is the IEEE 802.11 wireless LAN standard.

The method includes running a plurality of WSTP instances of WSTP, each instance defining a corresponding wireless spanning tree topology including a corresponding root wireless mesh point.

Running a WSTP instance in a particular wireless mesh point includes maintaining information on the spanning tree topology corresponding to the WSTP instance. The corresponding spanning tree topology is for a corresponding set of wireless mesh points that includes the particular wireless mesh point, and is for wirelessly communicating among the corresponding set of wireless mesh points. The maintained information includes the identity of the corresponding root wireless mesh point for the corresponding spanning tree topology, and, in one version, a unique identifier for the WSTP instance.

Running a WSTP instance further includes wirelessly sending a control/management frame, e.g., a beacon frame and, in the case a probe request frame was received that includes a bridging information request, a probe response frame. The control/management frame, e.g., beacon or probe response frame includes an indication that BPDU information is encapsulated, and encapsulates BPDU information that substantially conforms to IEEE standard 802.1 spanning tree protocol BPDU information, but with the path cost calculated according to wireless information.

Running a WSTP instance further includes, as a result of receiving a control/management frame, e.g., a beacon frame or probe response frame at the particular mesh point, ascertaining if the received control/management frame, e.g., beacon or probe response frame includes encapsulated BPDU information, and if there is encapsulated BPDU information, updating the maintained information on the corresponding spanning tree topology, and accordingly modifying any BPDU information for sending in an encapsulating control/management frame, e.g., beacon frame and/or probe response frame.

The BPDU information includes an indication of the identity of the spanning tree topology of the plurality of topologies corresponding to the WSTP instances.

In a typical environment, the root mesh point of at least one of the spanning tree topologies corresponding to the WSTP instances has an uplink to a first wired network. As one example, the first wireless mesh point has an uplink to a first wired network.

One set of embodiments is applicable for what we call multiple overlay spanning tree topologies. In one such embodiment, at least two of the spanning tree topologies corresponding to the WSTP instances have the same root tree mesh point. In one version, the first wireless mesh point is the root node of the spanning tree topologies of the WSTP instances that have the same root tree mesh point. Typically, the root mesh point, e.g., the first wireless mesh point has an uplink to a first wired network.

In one overlay embodiment, each of the WSTP instances that have the same root tree mesh point uses a different path cost criterion. For example, in one version, the different path cost criteria are selected so that traffic is wirelessly transported between mesh points via different ones of the wireless spanning tree topologies of the WSTP instances that have the same root tree mesh point with but with different qualities of service (QoS). In one version, traffic in the wireless network includes traffic for a plurality of VLANs, with one VLAN per spanning tree topology of the WSTP instances that have the same root tree mesh point.

Another set of embodiments is applicable for what we call multiple overlay spanning tree topologies. In one such embodiment, at least two root mesh points of at least two of the spanning tree topologies corresponding to the WSTP instances are different.

In one embodiment, the distinct root mesh points of at least two spanning tree topologies form a mesh of root mesh points as a result of the distinct root mesh points running a master WSTP instance forming a master wireless spanning tree topology. One of the distinct root mesh points forms the root mesh point of the master wireless spanning tree topology, such that a hierarchy of WSTP instances is run.

In one lateral embodiment, the at least two distinct root mesh points of at least two of the spanning tree topologies corresponding to the WSTP instances have uplinks to a first wired network. The method includes, for traffic addresses in the first wired network or beyond, performing load balancing including routing traffic to different root mesh points that have an uplink to the first wired network Other features, advantages, and aspects are described further herein.

Figure 1:
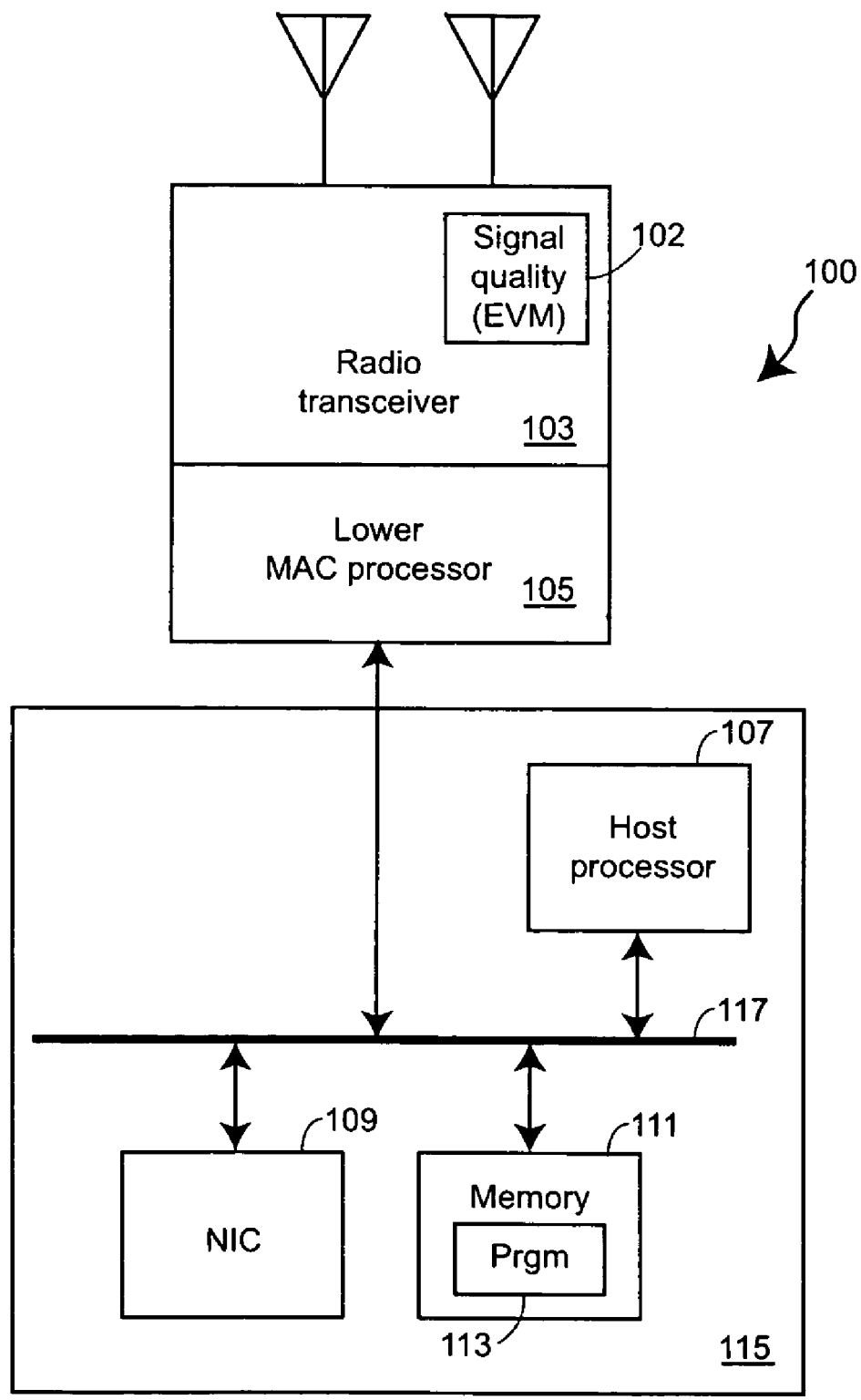
FIG. 1 shows a simplified block diagram of a device running the WSTP wireless spanning tree protocol that includes aspects of the present invention, and as well as an 802.1 spanning tree protocol.

Other features, advantages, and aspects are described further herein.

DETAILED DESCRIPTION

Presented herein is a wireless spanning tree protocol that combines aspects of a wireless network standard such as the IEEE 802.11 WLAN standard that provides a mechanism for wireless network entities to wirelessly communicate wireless network information using control/management frames, e.g., to transmit beacon or probe response frames to other wireless network entities to advertise the radio characteristics of the transmitting wireless network entity, and a standard spanning tree protocol such as the IEEE 802.1 spanning tree protocol. The inventive wireless spanning tree protocol is called WSTP (for wireless spanning tree protocol) herein. WSTP is consistent with the standard IEEE 802.1 spanning tree protocol but has extended features for operating in a wireless network (we say substantially conforms to the standard IEEE 802.1 spanning tree protocol), and is suitable for fixed and mobile; infrastructure, ad hoc and hybrid wireless networks. The invention is described with reference to the IEEE 802.11 standard. However, is not restricted to WLANs that conform to the IEEE 802.11 standard, and may easily be adapted to other wireless networks, e.g., any standard that provides control/management frames for control and management purposes. The description herein is for a wireless network standard that provides a mechanism for a wireless node to wirelessly transmit beacon frames or probe responses to other wireless nodes to advertise the radio characteristics of the wireless node, or the equivalent of beacon frames or probe response frames.

The WSTP Invention

The WSTP Invention is described in the WSTP Application, concurrently filed and incorporated herein by reference. One aspect of the WSTP Application describes a method for implementing a WSTP wireless spanning tree protocol in a wireless station that substantially conforms to the IEEE 802.11 standard such that the station acts as a bridging entity (a "wireless Dbridge") that generates a wireless spanning tree topology compatible with (so substantially conforming to) a tree topology as set up by the standard IEEE 802.1 spanning tree protocol, but for wireless networks. Also described herein is a wireless network with one or more wireless Dbridges. Wireless Dbridges typically form bridging entities in a wireless mesh network. In such use, each wireless Dbridge forms a mesh point for the mesh.

One aspect of the WSTP Invention is that using an instance of the WSTP wireless spanning tree protocol proactively prevents any type of temporary loops by only establishing radio links that are warranted by the spanning tree protocol algorithm.

Another feature of embodiments of the WSTP wireless spanning tree protocol described in the WSTP Application is that such a protocol is an extension of the standard IEEE 802.1 spanning tree protocol, with low impact on existing functionalities, making it easy to integrate into existing products.

Another feature of the WSTP wireless spanning tree protocol described in the WSTP Application is that all spanning tree protocol operations are localized in the wireless bridging devices (the wireless Dbridges, also called mesh points). No changes in either router or end station operations are needed.

The WSTP wireless spanning tree protocol described in the WSTP Application has the potential to create multiple tree-like topologies in wireless mesh networks.

One embodiment described in the WSTP Application is a method of implementing a wireless spanning tree protocol in a wireless network conforming to a wireless network standard such that the wireless spanning tree protocol substantially conforms to a standard IEEE 802.1 spanning tree protocol. The wireless network is a mesh or partial mesh wireless network that includes a first wireless bridging node—a first wireless mesh point, and at least two other wireless bridging nodes—other wireless mesh points. The method is implemented in the first wireless mesh point. The wireless network standard provides a mechanism for wireless network entities to wirelessly communicate wireless network information using control/management frames, e.g., to transmit beacon or probe response frames to other wireless network entities to advertise the radio characteristics of the wireless network entity. The wireless spanning tree protocol acting to determine a spanning tree topology amongst the wireless bridging nodes, including a root wireless bridging node. The method includes wirelessly transmitting bridging information (BPDU information) in the form of bridging protocol data units (BPDUs) to other mesh points of the mesh or partial network encapsulated in one or more control/management frames, e.g., beacon frames (including probe response frames). Thus, the IEEE 802.11 protocol is very slightly modified so that BPDU information is included in control/management frames, e.g., beacons and probe response frames. The BPDU information relates to a spanning tree topology containing the first and one or more other wireless bridging nodes. Each BPDU substantially conforms to a standard IEEE 802.1 spanning tree protocol BPDU, with a path cost designed for wireless communication.

In one method embodiment, the wireless standard is the IEEE 802.11 wireless LAN standard. So modifying the IEEE 802.11 protocol to provide for so encapsulating BPDU information still maintains a wireless MAC protocol stack that substantially conforms to the IEEE 802.11 standard.

Embodiments described in the remainder of the description are include encapsulating BPDU information in beacon and/or probe response frames. Those in the art will understand that in alternate versions, the BPDU information In one method embodiment, BPDU information is encoded into a beacon or probe response as an information element, e.g., 0x40. The size of a BPDU is typically in the range of 300-600 bytes and can be up to 1200 bytes.

In one implementation, a beacon or probe response frame from the first wireless bridging node includes an indication of whether or not BPDU information is included. In one embodiment, a flag is used in a beacon frame or probe response that includes BPDU information. In another embodiment, the inclusion itself acts as the indication that the beacon frames or probe response includes one or more BPDUs. In the case the flag is included in a beacon or probe response to indicate whether or not BPDU information is included, in one embodiment, the indication is in a field called the "Capability field," e.g., B14, of the beacon or probe response. This provides for WSTP wireless spanning tree protocol-capable-devices such as a wireless Dbridges to identify each other by examining beacons and probe responses.

The BPDU information includes the parameters in the standard IEEE 802.1 spanning tree protocol. For example, a mesh point maintains several spanning tree protocol times: the Hello Time is the time between each Bridge Protocol Data Unit (BPDU) that is sent, e.g., by the root device; the Forward Delay is the time a device will wait in the listening and learning state before changing states; and the Max Age is the maximum length of time a bridging device waits without receiving a configuration message before attempting to reconfigure, i.e., the maximum time the device saves the current configuration information.

In one embodiment, for a wireless Dbridge that broadcasts BPDU Information in beacon frames, the spanning tree protocol Hello Time, Forward Delay and Max-Age parameters are a function of the beacon interval of the wireless Dbridges, and in particular, an integer multiple of the beacon interval. In one embodiment, the multiple is configurable, e.g., by a network administrator.

One method embodiment further includes wirelessly receiving one or more beacon frames from one or more other mesh points of the (mesh or partial mesh) network. The received beacon frames encapsulate BPDU information. The method further includes using the encapsulated BPDU information received in the beacon frames from the other mesh points to discover the spanning tree topology in the first mesh point's vicinity, and further to find the best path to the root bridge of the discovered spanning tree topology in the vicinity, such that a decision as to whether or not to include a radio link that includes the first mesh point in the spanning tree topology is possible when the spanning tree topology is first established.

One method embodiment further includes wirelessly receiving one or more beacon frames from one or more other mesh points of the (mesh or partial mesh) network. The received beacon frames encapsulate BPDU information. The method further includes using the encapsulated BPDU information received in the beacon frames from the other mesh points to discover the next other mesh point in the best path to the root bridge of the spanning tree topology prior to establishing a forwarding radio link with the next other mesh point.

IEEE 802.11 MAC protocol provides not only for broadcasts of beacons, but also for stations to request such information using a probe request frame. One method embodiment of the invention further includes sending a probe request frame that contains a request to other mesh points to send a probe response frame encapsulating BPDU information; wirelessly receiving one or more probe response frames from one or more other mesh points of the mesh or partial mesh wireless, the probe response frames encapsulating BPDU information; and using the encapsulated BPDU information received in the beacon frames from the other mesh points to discover the spanning tree topology in the first mesh point's vicinity, and further to find the best path to the root bridge of the discovered spanning tree topology in the vicinity.

One method embodiment further includes sending a probe request frame that contains a request to other mesh points to send a probe response frame encapsulating BPDU information; wirelessly receiving one or more probe response frames from one or more other mesh points of the mesh or partial mesh wireless network, the probe response frames encapsulating BPDU information; and using the encapsulated BPDU information received in the probe response frames from the other mesh points to discover the next other mesh point in the best path to the root bridge of the spanning tree topology prior to establishing a forwarding radio link with the next other mesh point.

One method embodiment further includes receiving a probe request frame that contains a request from other mesh points to send a probe response frame encapsulating BPDU information; and sending one or more probe response frames encapsulating BPDU information in response to the received probe request frame.

Note that there may be some implementations of the IEEE 802.11 standard that do not permit using beacon frames that include a BPDU information element. In such an implementation, a wireless mesh point can send a probe-request as described above so that it can receive BPDU information, and the BPDU information is included in probe-responses as described above.

In one embodiment, the encapsulated BPDU information includes one or more radio parameters for path cost calculation for the path cost between a receiving mesh point and other mesh points.

In one example, the path cost for determining the spanning tree topology is a weighted sum of at least two of the included radio parameters. In a particular version, the one or more included radio parameters include one or more of the received signal strength, the available transmission power, a measure of mobility of the first mesh point, and the hop count. In one version, the first mesh point includes a received signal quality calculator to provide a measure of received signal quality. The one or more included radio parameters then includes the measure of the received signal quality.

Thus, in particular, the path cost, denoted Path_cost is given by:

$$\text{Path\_cost} = w1*\text{signal\_strength} + w2*\text{transmission\_power} + w3*\text{mobility} + w4*\text{signal\_quality} + \text{hop\_count}.$$

where * is multiplication, and w1, w2, w3 and w4 are weight factors configurable to give relatively more weight to those factors deemed more important to a wireless Dbridge.

Those in the art will understand that in determining the weighted sum, each of the radio parameters is appropriately scaled and normalized. In one embodiment, signal_strength is the signal strength mapped from dBM to an unsigned integer index, transmission_power is the transmission power mapped from dBM to an unsigned integer index, mobility is a configurable integer parameter that has a pre-defined maximum value indicating fixed, and a pre-defined minimum value indicating that sending device is highly mobile, and hop_count is an integer indicating the number of hops from the root bridge, with a single increment of 1 for each hop away from the root bridge. Recently designed wireless stations include a measure of the received signal quality, e.g., as a measure of the EVM of the received signal. For such stations, one embodiment includes in the path cost, signal_quality, a measure of the received signal quality, e.g., as indicated by the EVM of a received signal, scaled to an integer value.

In one implementation, in the case the network includes stations that do not provide a signal quality, a default value is used for such stations. In another embodiment, the Path_cost is:

$$Path\_cost = w1*signal\_strength + w2*transmission\_power + w3*mobility + hop\_count.$$

Selecting the weightings w1, w2, and w3 (and w4) gives more weight to whichever factor is more important for a wireless bridging entity. In one embodiment, selecting the weights is based on policy and administered as per a given network. Thus, a public network, a military network, and an emergency mesh network may have different relative values, with (different) default values provided for each type of network. Battery-operated wireless bridging entities may have higher w3 and a mobile wireless bridging entity may have higher w4. Note also that the path cost weightings are also configurable based on the type of IEEE 802.11 radio-link, e.g., IEEE 802.11a, IEEE 802.11b or IEEE 802.11g, as well as user specifications.

One method embodiment further includes wirelessly receiving one or more beacon frames or probe response frames from one or more other mesh points of the mesh or partial mesh wireless network, the received beacon or probe response frames encapsulating BPDU information including path costs; and storing path costs of encapsulating BPDU information received from other mesh points. A version further includes maintaining a forward-delay timer for a Forward Delay as defined for a standard IEEE 802.1 spanning tree protocol. When the forward-delay timer expires, the method includes establishing a point-to-point radio-link with the mesh point that provides the least-cost path to the root bridge according to the spanning tree topology.

One method embodiment further includes wirelessly receiving one or more beacon frames or probe response frames from one or more other mesh points of the mesh or partial mesh wireless, the received beacon or probe response frames encapsulating BPDU information including path costs; and storing path costs of encapsulated BPDU information received from other mesh points. A version further includes storing radio path costs for alternate and/or backup links to links in the spanning tree topology.

In one embodiment, each wireless mesh point determines path cost to the root. Initially, a wireless mesh point starts with itself as the root and waits to receive better path cost information in beacons or probe responses.

Each wireless mesh point maintains a data structure, in one embodiment, a table called a path cost table that stores, e.g., caches path costs so calculated according to information provided by other wireless mesh points as BPDU information. The path cost table thus tabulates a wireless mesh point's own past cost parameters, such as signal strength, transmit power, and so forth, and also the path costs of neighbors from which the wireless mesh point can and does directly receive beacons and probe responses from. Thus, the path cost table provides information on neighbors including the wireless link cost to each neighbor.

Note that each mesh point further maintains a Bridge forwarding table that provides information on the active network topology as it is learned. The structure of the Bridge Forwarding Table is very similar to that used in the standard 802.1 protocol, with an addition to each entry (called the Bridge Table Entry or BTE) being the associated radio/channel information to replace the port information of an IEEE standard 802.1 spanning tree protocol. The Bridge forwarding table of a wireless mesh point is also called a "WSTP table."

A wireless mesh point sends BPDU information that includes both path cost and its priority. A mesh point receiving the BPDU information combines BPDU information received from other wireless mesh points, and selects the root bridge, as well as the best path to the root. The path cost table information is fed to the standard IEEE 802.1 spanning tree protocol process as necessary to revise the tree and provide information to other mesh points, e.g., in beacon frames if the system supports such beacons, or in probe response frames when queried by other wireless mesh points.

When a tie-breaking process is necessary because equal cost paths emerge, in one embodiment, tie-breaking is based on radio signal parameters, e.g., one or both of signal strength and signal quality. In a particular implementation, equal cost paths are decided based on the following parameters in order:

1. Priority.
2. Received signal strength.
3. Transmission power available.
4. Mobility (MOB).

In one embodiment, one or more external parameters also are used for tie breaking rather than only locally derived information as described in 1 to 4 above. For example, suppose there are two paths A to B to C that have equal cost. In one embodiment, A chooses one of these paths to C based on the A to B path cost.

In any wireless Dbridge, once the spanning tree protocol Forward Delay time expires on a wireless Dbridge, that wireless Dbridge establishes a point-to-point radio-link with the wireless Dbridge providing the least-cost path to the root bridge. This is the wireless equivalent to a bridge placing its root port in the forward state. Note that no wireless link need occur until the spanning tree topology has been calculated and the wireless Dbridge is ready to change states.

One method embodiment further includes wirelessly receiving one or more beacon or probe response frames from one or more other mesh points of the mesh or partial mesh wireless network. The received beacon or probe response frames encapsulates BPDU information. The method further includes storing information on dormant alternate and/or backup links with other wireless mesh points, ascertaining whether or not there is a need to use an alternate and/or backup link, and upon ascertaining the need for a dormant alternate and/or backup link, activating one or more of the dormant alternate and/or backup links according to the stored information.

One method embodiment further includes wirelessly receiving one or more beacon or probe response frames from one or more other wireless mesh points of the mesh or partial mesh wireless network, the received beacon or probe response frames encapsulating BPDU information, the encapsulated BPDU information including a priority for the transmitting mesh point, the priority measure taking into account whether or not there is an uplink at the mesh point.

The one or more functions includes selecting the root bridge, and wherein selecting of the root bridge depends on factors including the priority measure of the wireless mesh points. In one version, the priority measure further takes into account the link speed of the uplink.

In one version, in the case that there are multiple mesh points that have uplinks, each multiple mesh point having an uplink forms a root of a separate spanning tree topology such that multiple spanning tree topologies exist.

IEEE 802.1 wired spanning tree protocols provide alternate backup paths, e.g., operational links that are blocked. One aspect of the present invention is that a wireless spanning tree protocol provides alternate and/or backup links. This is carried out by:

A) Maintaining a list of potential alternate and/or backup wireless Dbridges in the path cost table on each wireless Dbridge. In one embodiment, the path cost table in a wireless Dbridge maintains an attribute for each wireless bridging entity available for possible future associations that is indicative of the bridging entity's potential as a wireless bridging entity.

In one embodiment, the path cost table is updated periodically and whenever a beacon/probe response arrives with updated BPDU information. Should the current root link go down, a wireless Dbridge can quickly select the best wireless Dbridge from the path cost table, and re-establish a link to the root bridge. The procedure described below for leaving and joining the wireless network are followed.

B) Establishing dormant alternate and/or backup links with wireless Dbridges, and activating such a dormant link when an active link goes down.

Both methods A and B use the included spanning tree protocol stack on a wireless Dbridge to select alternate and/or backup wireless Dbridges/links. The former method A requires explicitly establishing a link when an active spanning tree protocol link fails whereas the latter can just activate an already established link by sending a "wakeup" message to the alternate/backup wireless Dbridge. Hence, the second method provides for faster convergence of the network to the final spanning tree topology. The second method, however, requires more wireless bandwidth because a spanning tree protocol always blocks links from the children. In one embodiment, the WSTP wireless spanning tree protocol makes alternate/backup wireless Dbridges aware of which dormant links from such wireless Dbridges are going down.

One method embodiment further includes wirelessly receiving one or more beacon or probe response frames from one or more other mesh points of the mesh or partial mesh wireless network, the received beacon or probe response frames encapsulating BPDU information; and using the encapsulated BPDU information received in the beacon frames from the other mesh points to discover the spanning tree topology in the first mesh point's vicinity, and further to find the best path to the root bridge of the discovered spanning tree topology in the vicinity. In this embodiment, the encapsulated BPDU information provides for the first mesh point to perform mobility operations including one or more of: negotiating security and QoS parameters with another mesh point; establishing a logical spanning tree protocol link with another mesh point; tearing down a logical spanning tree protocol link with a wireless Dbridge; and sending the wireless Dbridge and station addresses of all the children of the first mesh point in the spanning tree topology.

Another aspect of the WSTP Invention is that the WSTP wireless spanning tree protocol enhances support for mobility aspects such as a sub-tree of the network leaving or joining the wireless network, a node, e.g., a wireless mesh point leaving or joining the wireless network, and a sub-tree or a node, e.g., a wireless mesh point switching to a better link in the wireless network. By including support for mobility-related operations as BPDU information in beacons and probe-responses, one aspect of the invention is providing for these mobility-related operations without requiring re-calculation of the spanning tree topology.

In one version, each of these mobility-related operations are supported by one or more of the following relatively simple operations:

Pre-Attach: Negotiate security and QoS parameters with a wireless mesh point.

Attach: Establish a logical spanning tree protocol link with a wireless mesh point.

Detach: Tear down a logical spanning tree protocol link with a wireless mesh point.

Register: Send the wireless mesh point and station addresses of all the children, including both hardware and network addresses, as gratuitous ARP messages to 'add' to all parent Bridge Tables.

Deregister: This is a combination of "Register" and "Detach."

Path-Update: In some embodiment, this is the same as "Deregister" but outbound.

As a first example, suppose a first wireless mesh point detects loss of a link inbound towards the root. A Deregister message is sent from the first wireless mesh point. Upon receiving this message, a second wireless mesh point deletes all entries of the lost sub-tree in its forwarding table. Without further mechanisms, the higher the lost wireless mesh point is in the active topology, the longer it takes for the topology to re-converge. One aspect of the invention includes not re-calculating the tree but rather continuing using the principal spanning tree protocol instance as the one with the sub-tree which contains the root. This aspect includes keeping the forwarding tables up-to-date in all wireless mesh points in the rooted sub-tree. Thus, the spanning tree protocol instance is preserved.

Consider now a wireless mesh point that is not part of an up and running wireless spanning tree protocol. Such a wireless mesh point may advertise itself as the root bridge and as having a better path cost then some wireless mesh points that are part of the wireless spanning tree topology generated by the protocol instance. It is not desirable for wireless mesh points that are part of a WSTP wireless spanning tree topology to give into such claims. The link quality with the new wireless mesh point may not be acceptable or the relevant part of the network may not be able to accept further wireless mesh points due to capacity limitations, QoS considerations, and so forth. In one aspect of the invention, a make-before-break approach is followed, according to which a wireless mesh point goes through three steps to join the network:

(1) pre-establishing itself using Pre-attach, wherein the wireless mesh point negotiates with a potential low-cost link to ensure that all radio characteristics are indeed acceptable and that the link can accept additional wireless mesh points;

(2) deregistration using Deregister in the case (1) succeeds; and (3) joining the network using Attach.

Only a wireless mesh point in the current spanning tree topology of the current protocol instance can claim to be a root. All wireless mesh points that are part of a current spanning tree protocol instance maintain a flag such that they will not give into the claim of a new wireless mesh point wanting to join as the root. All wireless mesh points that are part of a current spanning tree protocol instance must flag such "extended beacons" or "extended probe responses" so that new/re-establishing wireless mesh point can quickly establish a link upon receiving BPDU information rather than by going through a relatively long learning stage.

When the spanning tree topology is first established, the root bridge sends a unique wireless spanning tree topology instance-ID to all its children when the spanning tree topology is first established. This wireless spanning tree topology instance-ID can be the root bridge-ID. As it is already in the BDPU, this method is efficient. All wireless mesh points under this root bridge match BPDU information elements they receive in beacons and probe-responses against the new wireless spanning tree topology instance-ID, and filter all unmatched ones. Only a wireless mesh point belonging to the wireless spanning tree topology instance-ID can transform to a root bridge should the current root bridge fail. All wireless mesh points advertise the wireless spanning tree topology instance-ID in the BPDU information element so that a new wireless mesh point/sub-tree can join the network quickly rather than going through long listening/learning states. Any new wireless mesh point wanting to join this spanning tree topology must perform a Pre-Attach operation to increase the probability of success of an Attach.

One method embodiment further includes wirelessly receiving one or more beacon or probe response frames from one or more other mesh points of the mesh or partial mesh wireless network, with the received beacon or probe response frames encapsulating BPDU information. In this embodiment, the wirelessly transmitting and receiving of the beacon or probe response frames encapsulating the BPDU information is in a separate, low-rate channel.

In one implementation, the first mesh point includes two radio transceivers such that the first mesh point can transmit and receive the beacon or probe response frames encapsulating the BPDU information in the separate, low-rate channel simultaneously to forwarding data.

In another implementation, the method further includes: going off-channel to the low-rate control channel to listen for or to transmit beacons encapsulating BPDUs whenever necessary.

One method embodiment further includes wirelessly receiving one or more beacon or probe response frames from another mesh point of the mesh or partial mesh wireless network, the received beacon or probe response frames encapsulating BPDU information including an "I'm alive" BPDU message; waiting until a pre-defined number of beacons from the other mesh point are missed; and tearing down the radio-link from the other mesh point only after the pre-defined number of beacons are missed.

In one embodiment, the mesh or partial mesh wireless network includes an uplink to another network, the other network linked to an authenticating server. The method further includes the first mesh point establishing security credentials with the authenticating server. The root bridge stores security credentials of all members of the spanning tree topology.

One embodiment also described in the WSTP Application is a first wireless bridging node (a first wireless mesh point) in a multi-hop wireless network (a mesh or partial mesh wireless network) conforming to a wireless network standard. The wireless network includes a plurality of wireless mesh points including at least two other wireless mesh points. The wireless network standard provides a mechanism for wireless network entities to wirelessly communicate wireless network information using control/management frames, e.g., to transmit beacon or probe response frames to other wireless network entities to advertise the radio characteristics of the wireless network entity. The first mesh point includes a radio transceiver and a wireless MAC protocol processor coupled to the radio transceiver, such that the radio transceiver and MAC protocol processor combination is able to wirelessly send and receive frames substantially conforming to the wireless network standard. The first mesh point also includes a wireless spanning tree protocol processing system coupled to the transceiver and MAC processor, and configured to establish an active spanning tree topology that specifies the communication pathways between wireless bridging entities in the wireless network, the active spanning tree topology having a root node, the establishing being according to a wireless spanning tree protocol that substantially conforms to the standard IEEE 802.1 spanning tree protocol. The establishing of the active spanning tree protocol includes receiving spanning tree protocol capabilities from other wireless mesh points in beacon frames and probe response frames that encapsulate bridging information ("BPDU information") as bridge protocol data units (BPDUs), and announcing the spanning tree protocol capabilities of the first wireless mesh point by transmitting beacon frames and probe response frames that encapsulate BPDU information as BPDUs. The BPDUs substantially conforming to standard IEEE 802.1 spanning tree protocol BPDUs, with a path cost designed for wireless communication.

Also described in the WSTP Application is a bridging method in a first wireless station of a mesh or partial mesh wireless network substantially conforming to a wireless network standard that provides for sending beacons and probe responses to advertise the radio capabilities of a sending wireless station. The wireless network includes a plurality of nodes, the first wireless station and at least one other node operating as wireless bridging entities (wireless mesh points) of the mesh or partial mesh wireless network. The at least one other mesh point compatible with (so substantially conforming to) the standard IEEE 802.1 spanning tree protocol. The bridging method includes maintaining a spanning tree topology determined according to a spanning tree protocol that substantially conforms to an IEEE 802.1 spanning tree protocol using a wireless network path cost measure, the maintained spanning tree topology including a root node, and sending a beacon frame or probe response frame encapsulating bridging information (BPDU information) in the form of bridging protocol data units (BPDUs) such that another wireless bridging entity of the wireless network can receive the BPDU information and amend any spanning tree topology maintained in the other bridging entity according to the received BPDU information.

Also described in the WSTP Application is a means for operating for a standard IEEE 802.1 spanning tree protocol to work in a mesh or partial mesh wireless network conforming to a wireless network standard, the wireless network including a first wireless mesh point and at least two other mesh points of the mesh or partial mesh network. The means for providing is in the first mesh point. The wireless network standard provides a mechanism for wireless network entities to wirelessly communicate wireless network information using control/management frames, e.g., to transmit beacon or probe response frames to other wireless network entities to advertise the radio characteristics of the wireless network entity. The means for providing includes means for carrying out the steps described in the above method embodiments. For example, the means for providing includes means for wirelessly transmitting BPDU information to other mesh points of the network encapsulated in one or more beacon frames, the BPDU information relating to a spanning tree topology containing the first and one or more other mesh points.

Also described in the WSTP Application is a computer readable carrier medium carrying computer readable code to instruct a processor of a processing system to implement a spanning tree protocol for a mesh or partial mesh wireless network such that the spanning tree protocol substantially conforms to the standard IEEE 802.1 spanning tree protocol. The wireless network includes a first mesh point and at least two other mesh points, the processor being in the first mesh point, the wireless network standard providing a mechanism for wireless network entities to wirelessly communicate wireless network information using control/management frames, e.g., to transmit beacon or probe response frames to other wireless network entities to advertise the radio characteristics of the wireless network entity. The carrier medium includes code to implement any of the method embodiments described above. For example, the carrier medium includes code to wirelessly transmit bridging information ("BPDU information") as bridge protocol data units (BPDUs) to other mesh points of the network encapsulated in one or more beacon frames, the BPDU information relating to a spanning tree topology containing the first and one or more other mesh points.

Another aspect is a method of implementing a spanning tree protocol for a wireless network conforming to a wireless network standard, the wireless spanning tree protocol substantially conforming to the standard IEEE 802.1 spanning tree protocol, including a first mesh point wirelessly transmitting BPDU information to other mesh points of the network or wirelessly receiving BPDU information to other mesh points, the BPDU information encapsulated in one or more beacon or probe response frames of the wireless network standard, the BPDU information relating to a spanning tree topology containing the first and other mesh points.

Another aspect of the WSTP Invention is a method in a first wireless network entity acting as a first mesh point of a mesh of wireless mesh points in a wireless network that substantially conforms to a wireless network standard. The wireless network standard provides a mechanism for wireless network entities to wirelessly communicate wireless network information using control/management frames, e.g., to transmit beacon or probe response frames to other wireless network entities to advertise the radio characteristics of the wireless network entity. The method includes running a first instance of a wireless spanning tree protocol that substantially conforms to the standard IEEE 802.1 spanning tree protocol. Running an instance of a substantially conforming wireless spanning tree protocol in a particular wireless network entity includes:

(a) maintaining information on a spanning tree topology for a set of wireless network entities that includes the particular wireless network entity, the spanning tree topology being for wirelessly communicating among the set of wireless network entities, the maintained information including the identity of a root wireless network entity for the spanning tree topology;

(b) wirelessly sending a beacon frame and, in the case a probe request frame was received that includes a bridging information request, a probe response frame, the beacon and probe response frame including an indication that BPDU information is encapsulated, and that further encapsulates BPDU information that substantially conforms to standard IEEE 802.1 spanning tree protocol BPDU information, but with the path cost calculated according to wireless information; and (c) as a result of receiving a beacon frame or probe response frame, ascertaining if the received beacon or probe response frame encapsulates BPDU information, and if there is encapsulated BPDU information, updating the maintained information on the first spanning tree topology, and accordingly modifying any BPDU information for sending in an encapsulated beacon frame and probe response.

In one embodiment, the first mesh point has an uplink to a wired network and is the root of the spanning tree topology of the first wireless spanning tree protocol instance.

The Mesh Point Hardware

FIG. 1 shows a simplified block diagram of a device 100 running an IEEE 802.11 MAC protocol stack, and a WSTP wireless spanning tree protocol stack. One version of the WSTP wireless spanning tree protocol stack includes an IEEE 802.1 spanning tree protocol stack, and a shim layer to the IEEE 802.1 spanning tree protocol stack. The resulting WSTP wireless spanning tree protocol stack substantially conforms to the standard IEEE 802.1 spanning tree protocol. The device 100 includes a radio transceiver 103 coupled to one or more antennas for transmitting and receiving messages, e.g., according to one or more of the IEEE 802 such as IEEE 802.11b, IEEE 802.11a, and/or IEEE 802.11g. In one embodiment, the transceiver includes a signal strength calculator 102 that, in one version, provides a measure of the EVM of the received signal. The transceiver 103 is coupled to a lower MAC processor 105 that carries out low-level MAC processing. The Lower MAC processor 105 is coupled to a first processing system 115 that includes at least one processor, shown as a single processor 107, a network interface (NIC) 109 to couple the device to a wired network, and a memory subsystem 111. These elements of the first processing system 115 are coupled by a bus subsystem 117 shown here as a simple bus. Details of the bus subsystem and other components are not shown in detail, and those skilled in the art will understand, for example, that the bus subsystem may contain several busses, as is common.

The IEEE 802.11 MAC protocol stack is implemented by the higher MAC functions together with the lower MAC functions carried out by hardware MAC processor 105. The higher MAC functions are implemented as code that instructs the processor 107 of the first processing system 115 to so implement these higher MAC functions. Aspects of the present invention, including the implementation of WSTP wireless spanning tree protocol shim layer as well as at least parts of a standard IEEE 802.1 spanning tree protocol also are in the form of code that when running on the processor 107 of the first processing system 115 causes the processing system to implement the spanning tree protocol. All the code is shown as code 113, although it would be understood by those in the art that not all instructions of such code are in the same memory at the same time. Thus, the device 100 includes a carrier medium carrying computer readable code configured so that the first processing system 115, when one or more of the system's processors execute the code, implements the WSTP wireless spanning tree protocol as described herein.

The combination of the hardware MAC processor 105 and the first processing system 115 forms a processing system coupled to the radio transceiver and that operates as a software/hardware entity in device 100 capable of running the wireless spanning tree protocol.

The device 100 is a typical mesh point. In one embodiment, the NIC 109 is coupled to a wired network such that the mesh point is connected to the wired network to form an uplink.

When an uplink is included, the mesh point is then a mesh point portal to the wired network.

Larger Mesh Networks

Now that we have described the wireless spanning tree protocol (WSTP) as the basic protocol for a 802.11 WLAN mesh, described below is how aspects of the present invention can be used to scale the wireless spanning tree protocol for larger mesh networks, and how aspects of the present invention can be used for selecting routes based on different streams having different quality of service (QoS).

Figure 2:
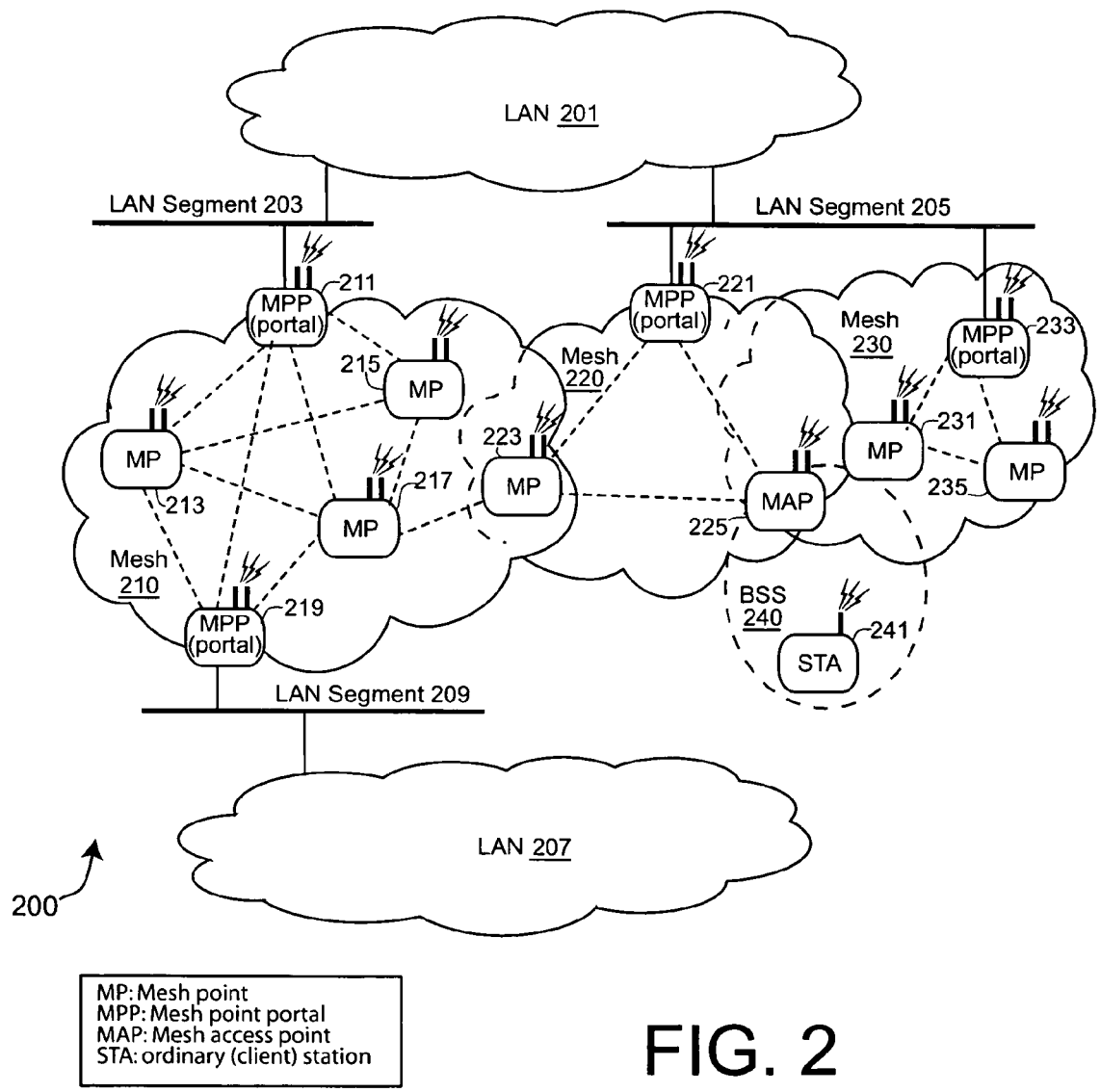
FIG. 2 shows an exemplary wireless mesh network that includes devices as described in FIG. 1 to illustrate aspects of the present invention, including a plurality of meshes each running a WSTP instance, according to an aspect of the invention.

FIG. 2 shows an exemplary network 200 in which the present invention can operate, parts of which will be used to explain aspects of the present invention. Network 200 includes three wireless mesh networks: mesh 210, mesh 220, and mesh 230. Mesh 210 includes mesh points 211, 213, 215, 217, and 219. Mesh point 211 is also a portal to a LAN segment 203 of a wired network 201, so is a mesh point portal. Mesh point 219 is a mesh point portal to a LAN segment 209 of a wired network 207. As an example, each wired networks can be a 802.1 LANs or the Internet.

A second mesh 220 includes a mesh point portal 221 to a LAN segment 205 of the network 201, and mesh points 223 and 225. Mesh point 225 also is an access point to an infrastructure wireless network—an IEEE 802.11 basic service set 240. Hence 225 is a mesh access point. One client station 241 of the mesh access point 225 is shown.

A third mesh 230 includes mesh points 231, 233, and 235, of which mesh point 233 is a mesh point portal to the LAN segment 205 of the network 201.

Consider the first mesh 210 and consider a first instance of the WSTP operating on the mesh points of mesh 210. As an example consider the WSTP operating on mesh point 211. One aspect is a method in a first mesh point, e.g., 211 acting as a first mesh point 211 of the first mesh 210 of wireless mesh points in a wireless network that substantially conforms to a wireless network standard. In the examples described herein, the wireless standard is the IEEE 802.11 standard. In general, the wireless network standard provides a mechanism for wireless network entities to wirelessly communicate wireless network information using control/management frames, e.g., to transmit beacon or probe response frames (or equivalents) to other wireless network entities to advertise the radio characteristics of the wireless network entity. The method includes running a first instance of WSTP. As described in the overview of the WSTP Invention above, running an instance of WSTP in a particular wireless mesh point includes maintaining information on a spanning tree topology for a mesh that includes the particular wireless mesh point. The maintained information including the identity of a root wireless mesh point for the spanning tree topology, including a unique identifier for the spanning tree topology.

Also as described in the overview of the WSTP Invention above, running an instance of WSTP includes wirelessly sending a beacon frame and, in the case a probe request frame was received that includes a bridging information request, a probe response frame. The beacon or probe response frame includes an indication that BPDU information, that substantially conforms to IEEE standard 802.1 spanning tree protocol, is encapsulated, but with the path cost calculated according to wireless information. As a result of receiving a beacon frame or probe response frame, running an instance of WSTP includes ascertaining if the received beacon or probe response frame encapsulates BPDU information, and, if there is encapsulated BPDU information, updating the maintained information on the spanning tree topology corresponding to the instance, and accordingly modifying any BPDU information for sending in an encapsulated beacon frame and probe response.

The BPDU information for each WSTP instance includes an indication of the instance, e.g., an indication of the spanning tree topology of the WSTP instance.

In the example described, the first wireless mesh point 211 has an uplink to segment 203 of wired network 201, and is the root of the first wireless spanning tree protocol instance.

Aspects of the present invention describe running multiple WSTP instances applicable, for example, when there is a plurality of mesh point portals, or where different trees are run with the same root mesh point (typically a mesh point portal).

Overlay Multiple Wireless Spanning Tree Topologies

Figure 3:
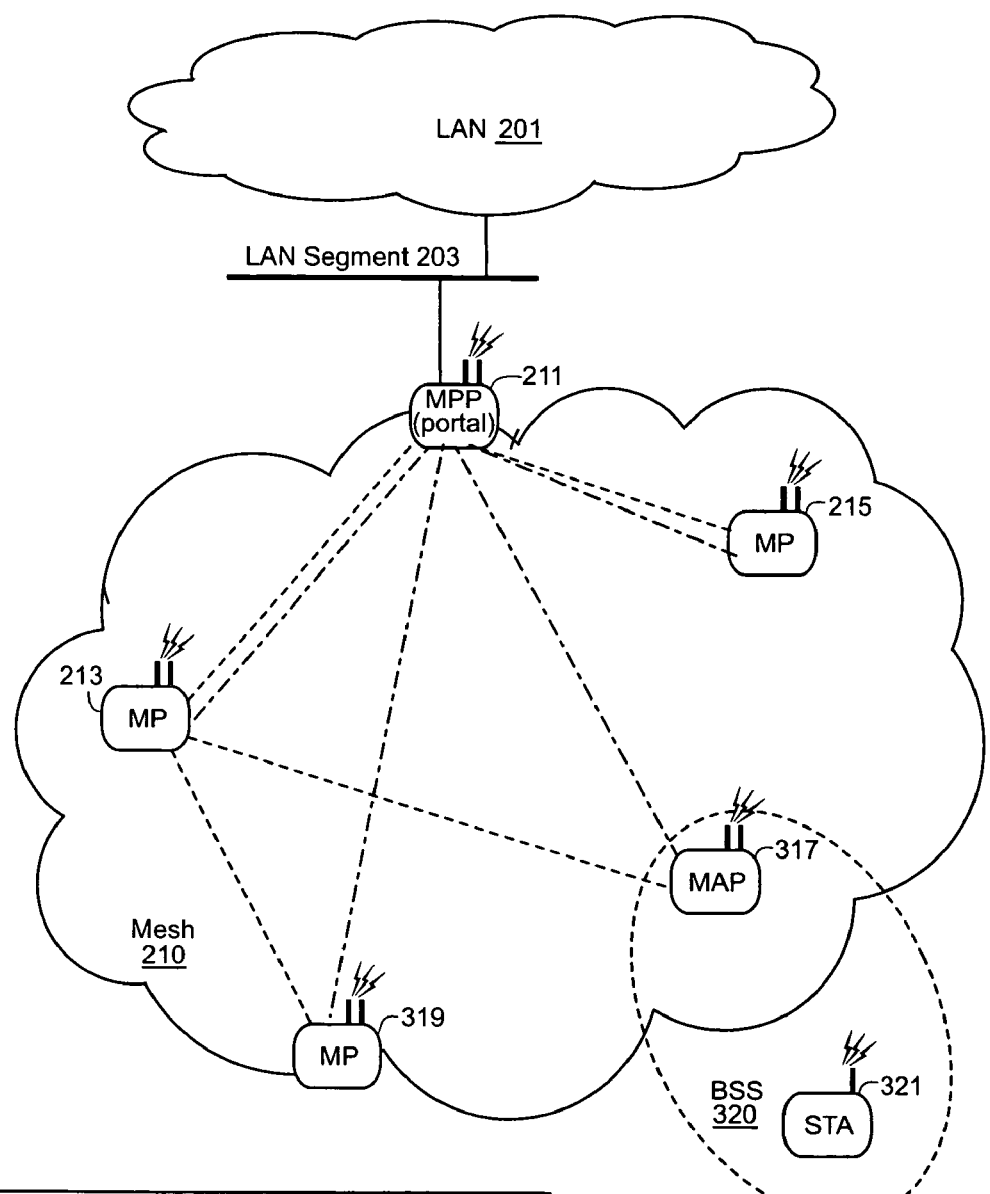
FIG. 3 shows an example of overlaid tree topologies having the same root mesh point and resulting from running a plurality of WSTP instances—two in the simplified example shown, according to an aspect of the invention.

One aspect of the invention is the formation of what we call overlay multiple wireless spanning tree topologies. Consider, for example a set of wireless mesh points with a single mesh point portal. For example, consider the mesh 210 of FIG. 2, but with mesh point 219 not being connected to the LAN segment 209, so that 219 is replaced by mesh point 319 that is not a mesh point portal. This is shown in FIG. 3 that shows a mesh of wireless mesh points 211, 213, 215, 317 (replacing 217 of FIG. 2), and 319 (replacing 219 of FIG. 2), with a single mesh point portal 211 coupled to the wired network 201. Mesh point 317 has dual radio transceivers, and also is an access point. Thus, it is what is called a mesh access point (MAP). It forms the access point to an infrastructure (BSS) network 320. One client station (STA) 321 is shown.

Overlay multiple wireless spanning tree protocol instances run with the same root bridge for all instances. Each instance of WSTP operates with a different path cost criterion, so that different wireless spanning tree topologies are built. As a simple example, FIG. 3 shows two instances of the WSTP defining a first spanning tree topology (spanning tree topology 1) and a second spanning tree topology (spanning tree topology 2).

According to a first embodiment, multiple VLANs run in the mesh, and a single spanning tree protocol instance is provided for each VLAN. This uses Cisco's Per-VLAN Spanning tree (PVST) technology (Cisco Systems, San Jose, Calif., related to the assignee of the present invention), but with wireless spanning tree topologies determined using WSTP instances. In the wireless network case, PVST thus maintains a wireless spanning tree topology instance for each VLAN configured in the network. In the simple example of FIG. 3, spanning tree topology 1 is maintained for a first VLAN (VLAN 1), and spanning tree topology 2 is maintained for a second VLAN (VLAN 2). Recall, for VLANs, each frame includes a VLAN tag.

For trunking, one embodiment uses Cisco's Inter-Switch Link (ISL) trunking mechanism (but between mesh points rather than switches), and another uses IEEE 802.1Q. Cisco's ISL which maintains VLAN information as traffic flows between switches and routers, and in the context presented here, wireless mesh points. IEEE 802.1Q trunking performs the same function as ISL, but uses a different frame format. ISL/IEEE 802.1Q allows a VLAN trunk to be forwarding for some VLANs while blocking for other VLANs.

Since PVST treats each VLAN as a separate network, it has the ability to load balance traffic (at layer-2) by forwarding some VLANs on one trunk and other VLANs on another trunk without causing a spanning tree topology loop. Note that PVST functionality was originally designed for wired devices. Thus, full PVST functionality is not suitable for wireless mesh points. According to an aspect of the invention, as a compromise, wireless mesh points are required to have only the ability to process VLAN tags, e.g., IEEE802.1Q VLAN tags in BPDUs and data frames.

One wireless spanning tree protocol instance runs per-VLAN and deals with traffic that has been classified traffic into one of a sunset of the set of classes that, like IEEE 802.11e consists of: Voice, Video, Best Effort, and Background. In such an embodiment, there are up to four wireless spanning tree protocol instances overlaid. In another embodiment, Best Effort and Background traffic is combined and routed via a single spanning tree topology determined by a single WSTP instance, so that only three spanning tree topologies are overlaid.

Figure 6:
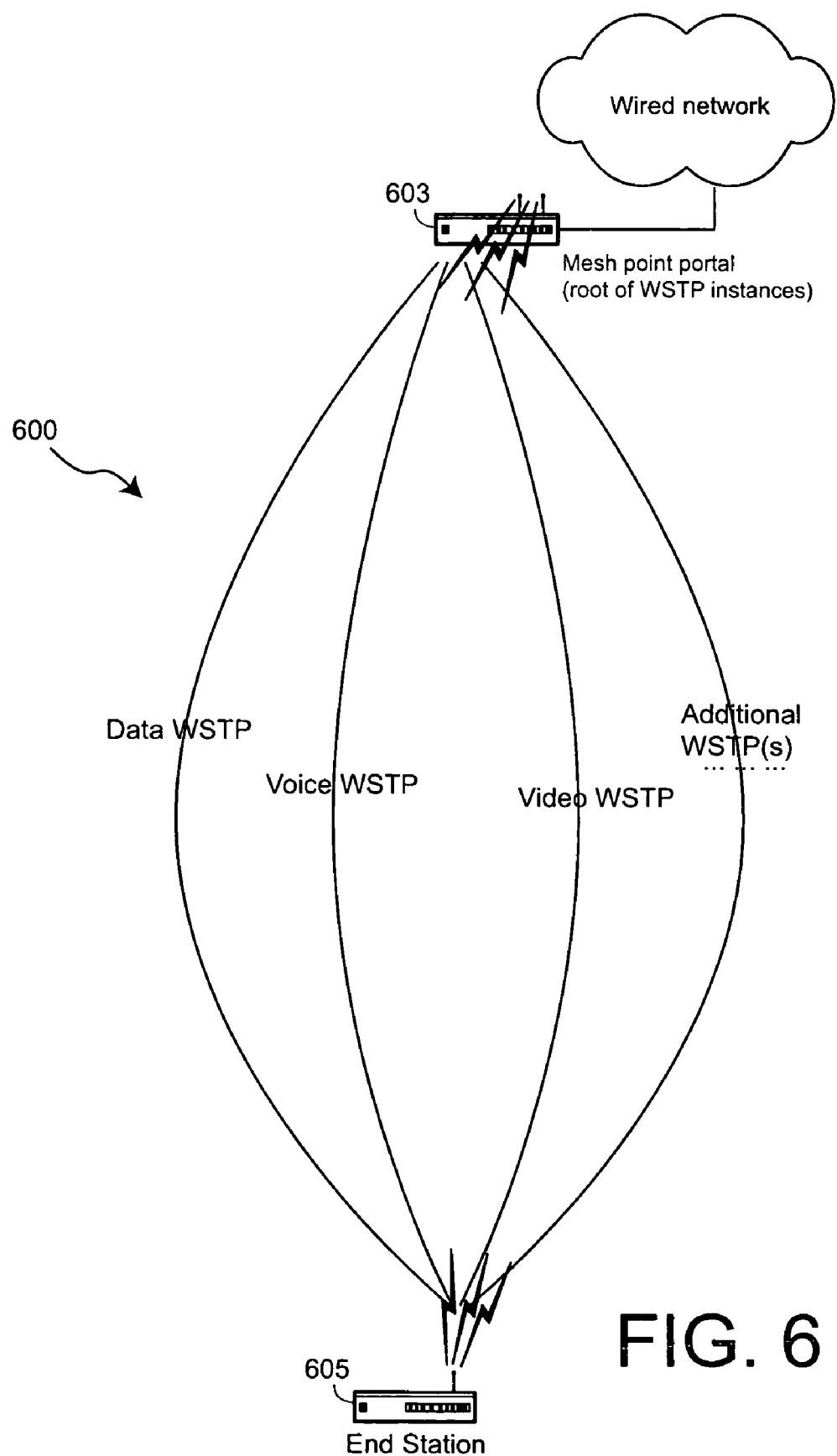
FIG. 6 shows a simplified example of different classes of traffic routed between a station and a mesh point portal via different overlaid tree topologies having the mesh point portal as the root mesh point.

The number of trees to run and the number of traffic classes to tie such trees to is completely flexible. FIG. 3, for example, shows data and voice running on two different VLANs, each VLAN provided with a wireless spanning tree topology. FIG. 6 shows an overlay mesh network 600 running at least four WSTP instances, and illustrates different classes of traffic routed between an end station 605 and a portal 603 to a wired network. The portal is also the root mesh point of the multiple overlay tree topologies of the WSTP instances. In one version, the classes of traffic are given different VLANS, with one VLAN per WSTP instance.

The formation of different wireless spanning tree topologies can use different path-cost metrics in order to build the most efficient tree topology for the traffic class to be transported over that tree topology. In one embodiment, these path-cost metrics are selected experimentally using real-life RF information as well as requirements of the traffic class in question. The bridge (forwarding) table maintained at each mesh point includes the multiple spanning tree topologies classified by VLAN tags. Thus, each wireless mesh point uses the VLAN tag and then looks up its bridge (forwarding) table to determine which wireless spanning tree protocol instance and tree topology a packet belongs to according to the VLAN tag before forwarding it.

The VLAN tag is inserted/removed into/from IEEE 802.11 frames by the first-hop wireless mesh point starting with the end-user. Thus, referring to FIG. 3, when client station 321 sends voice to the access point/mesh point 317, the access point/mesh point 317 inserts the VALN tag into all frames using, for example, the IEEE 802.11e priority information.

Overlay Multiple Wireless Spanning Tree Topologies and QoS

In a first embodiment, a wireless mesh point includes a mechanism to classify end user traffic into one of a predefined set of different classes. Thus, one embodiment includes a method in the wireless mesh point for classifying end user traffic into one of the predefined set of different classes.

One version uses Resource ReSerVation Protocol (RSVP) for the classification. See IETF RFC 2205 titled "Resource ReSerVation Protocol (RSVP)" available at http://www.ietf.org/rfc/rfc2205.txt. RSVP is a resource reservation setup protocol designed for an integrated services Internet, and provides receiver-initiated setup of resource reservations for multicast or unicast data flows, with good scaling and robustness properties. An elementary RSVP reservation request consists of a "flowspec" together with a "filter spec"; this pair is called a "flow descriptor." The flowspec specifies a desired QoS. The filter spec, together with a session specification, defines the set of data packets—the "flow"—to receive the QoS defined by the flowspec. The flowspec is used to set parameters in the node's packet scheduler or other link layer mechanism, while the filter spec is used to set parameters in the packet classifier. Data packets that are addressed to a particular session but do not match any of the filter specs for that session are handled as best-effort traffic. The flowspec in a reservation request will generally include a service class and two sets of numeric parameters: (1) an "Rspec" (R for 'reserve') that defines the desired QoS, and (2) a "Tspec" (T for 'traffic') that describes the data flow.

Thus, in one embodiment, the method in a mesh point for classifying traffic to be routed through one or another of a set of overlayed multiple spanning tree topologies defined by respective overlayed WSTP instances, uses Tspec for traffic classification. In one version, the method further includes encoding the appropriate 802.11e priority into the VLAN tag of frames. This priority information can be carried from the end-user, through all the hops in between the end-user and portal and to the portal. Each hop can map this priority information to IEEE 802.11e queues, access classes, Enhanced Distributed Channel Access (EDCA) parameters, and so forth (see the IEEE 802.11e standard) and achieve appropriate levels of QoS for the traffic class. This method ensures end-to-end QoS in a mesh network.

In an alternate embodiment applicable, for example, to not necessarily having multiple VLANS but to still having a plurality of WSTP instances with the same root mesh point, enhanced QoS is provided by including an additional information element (IE) to be embedded into BPDUs for QoS traffic classification purposes. The IE is called "Per-Access Class Capacity IE" or simply a "PC IE" herein. The PC IE has two fields:

An "Access Category" (AC) field to indicate one of a pre-defined set of classes that traffic is classified into.

An "Available admission capacity" (AAC) field. The AAC provides capacity in terms of medium time available per second. An AAC of 0 would mean that the link is not available for that AC.

In one implementation, the AC field values classify traffic into one of Voice (AC=3), Video (AC=2), Best Effort (AC=1), and Background (AC=0). At most four WSTP instances run one for each mesh point, with the same root tree mesh point for each spanning tree topology corresponding to the WSTP instance. Thus, for example, a BPDU associated with voice traffic includes a PC information element that has an AC field value of 3. Such a BPDU is used in a WSTP instance to advertise the spanning tree topology suitable for Voice traffic.

The AAC in the PC IE expresses the amount of capacity available for each access category of traffic. In one embodiment, the path-cost metric determining method for the relevant WSTP instance uses the AAC.

Using an additional BPDU information element can potentially avoid using VLANs for running each one of multiple spanning tree topologies, and rather uses separate WSTP instances for different traffic/access classes. This approach is usable, for example, if VLAN support is not available in some mesh devices Overlay Multiple Wireless Spanning Tree Topologies and Multicast Another aspect of the invention uses overlay structure of multiple spanning tree topologies using VLANs to provide advantages in multicast forwarding. According to one embodiment, wireless mesh points use the GARP (Generic Attribute Registration Protocol) VLAN Registration Protocol (GVRP). GVRP defines a GARP application that provides the 802.1Q-compliant VLAN pruning and dynamic VLAN creation on 802.1Q trunk ports. GVRP is an application defined in the IEEE 802.1P standard that allows for the control of 802.1Q VLANs.

According to one embodiment, GVRP is used to selectively choose on which VLANs wireless mesh points would like to receive multicast traffic from their parents recursively until the Root Bridge. Further, as VLANs are tied to traffic classes now, different types of multicast traffic are necessarily segregated to different wireless spanning tree protocol instances. This implies that, for example, the Video spanning tree topology will now be used to transport Video streaming multicast traffic only, and this spanning tree topology is designed with Video in mind, e.g., optimized for Video using QoS on every wireless mesh point in the network optimized for Video.

Note that in an alternate embodiment, it is possible to further categorize Video into non-multicast Video and Video multicast, and then to run different WSTP instances for each of these classes, resulting in different spanning tree topologies for each class using the overlay tree topology mechanisms described herein.

As far as multicast protocol is concerned, there is no need to devise any new protocol. The Internet Group Management Protocol (IGMP) is used; this has been found to work quite well in wireless spanning tree protocol-based mesh networks. Wireless mesh points snoop IGMP membership reports and prune multicast forwarding tables. For avoiding unnecessary flooding and duplication; and increasing multicast reliability.

Thus a wireless spanning tree protocol-based wireless mesh architecture has been presented, in particular a IEEE 802.11 wireless mesh architecture. A wireless spanning tree protocol is used as a basic building block to build large, scalable mesh wireless networks. An overlay mechanism is presented for using multiple wireless spanning tree protocol instances in such a way that the network can be differentiated as per different traffic classes and optimized for QoS and multicast forwarding.

Lateral Multiple Wireless Spanning Tree Topologies

Another aspect of the invention is the formation of what we call lateral multiple wireless spanning tree topologies. In such a case, a mesh point runs a plurality of WSTP instances, with different root mesh points, with the root mesh points having second interfaces to be able to be coupled to each other, e.g., via a set of wired or wireless links.

Consider, for example a plurality of mesh point portals, with each respective mesh point portal being the respective root of a respective spanning tree topology determined by running a respective instance of the WSTP. Referring, for example, to FIG. 2, there are four mesh point portals shown. In mesh 210 there is mesh point portal 211 and mesh point portal 219. In mesh 220, there is only one mesh point portal 221, and also a mesh point AP 225. Suppose, for the purpose of discussion, this is a mobile network. In mesh 230, there also is only one mesh point portal 233. Again, suppose mesh 230 is mobile.

Figure 4:
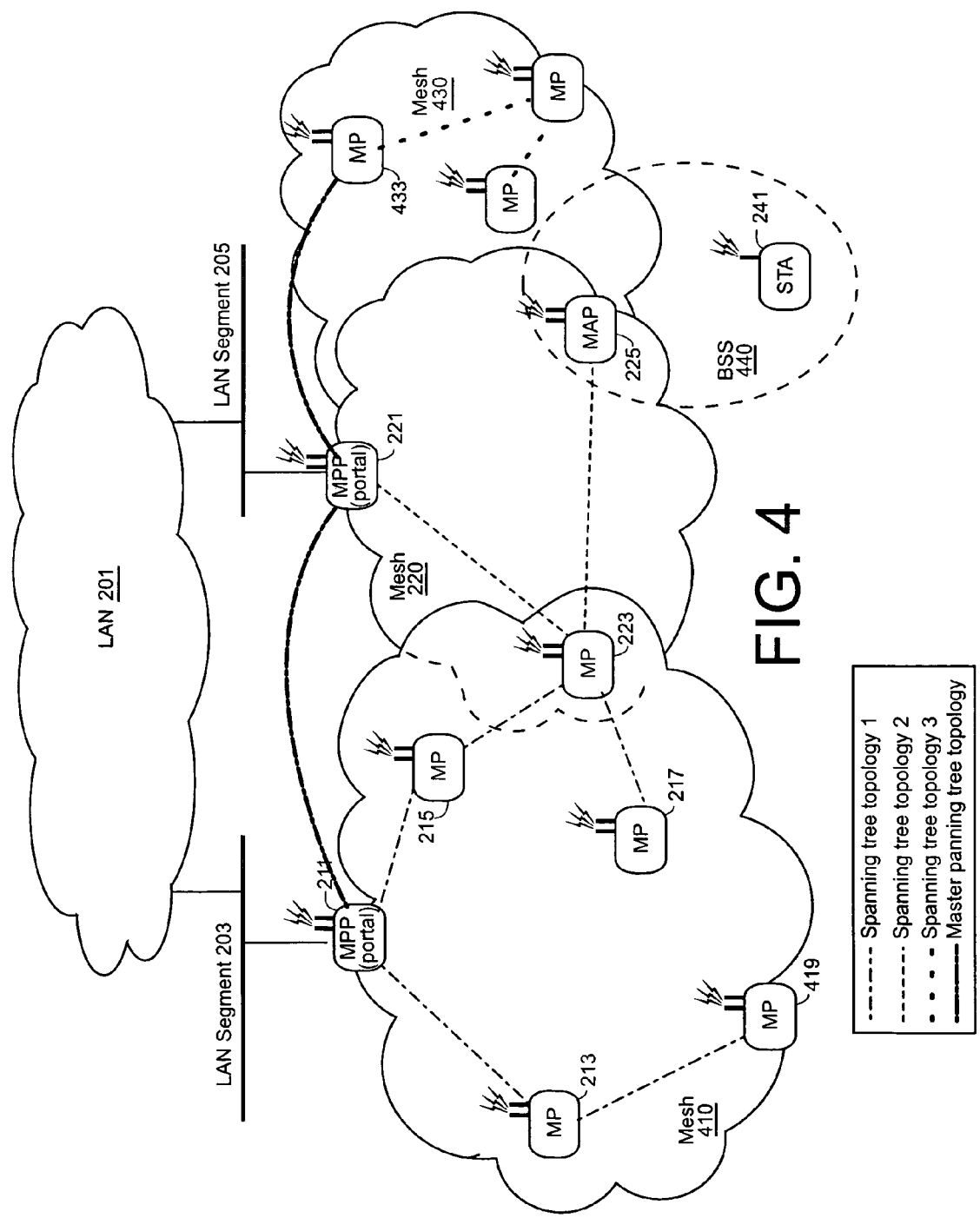
FIG. 4 shows a simplified example of a plurality of tree topologies and wireless meshes corresponding to running a plurality of WSTP instances. The tree topologies have different root mesh points. The root mesh points themselves are part of a master spanning tree topology from running a master WSTP instance, according to an aspect of the invention.

FIG. 4 shows three meshes: mesh 410, which is mesh 210 without the connection to network 207 via LAN segment 209, so with what was mesh portal 219 there is a simple mesh point 419; mesh 220; and mesh 430 which is the same as mesh 230 of FIG. 2, but with mesh point portal 233 replaced with a mesh point 433 that has no uplink. Suppose that these respective meshes are formed by running a respective instance of WSTP on each mesh, such that three instances of WSTP run, with the respective root mesh points of the three respective spanning tree topologies being mesh points 211, 221, and 433, respectively. In FIG. 4, mesh point 223 is part of both mesh 410 and mesh 220, and so runs multiple instances of WSTP.

We call the spanning tree topologies that result from running multiple instances of WSTP with different root mesh points lateral wireless spanning tree topologies.

One aspect of the present invention is how the roots of the multiple spanning tree topologies connect. Three cases are:

(a) The roots of all WSTP instances connected via the wired network. One aspect of the invention is that because each WSTP instance substantially conforms to the standard IEEE 802.1 spanning tree protocol, the network ports of each mesh point portal can seamlessly connect via the standard IEEE 802.1 spanning tree protocol. In addition, these multiple instances can also connect via the multiple spanning tree protocol (MST). See for example, the IEEE 802.1s standard. See also "Understanding Multiple Spanning Tree Protocol (802.1s)" available from Cisco Systems, Inc., of San Jose, Calif. as Document ID: 24248 (September 2005), or on the Web at http://www.cisco.com/warp/public/473/147.html. MST is inspired from the Multiple Instances Spanning Tree Protocol (MISTP) implementation described, for example, in U.S. Pat. No. 6,937,576 titled "MULTIPLE INSTANCE SPANNING TREE PROTOCOL.

(a) The roots of all WSTP instances connected via the wired network, and L3 routing is used to connect the WSTP instances.

(c) The roots of all WSTP instances are wirelessly connected, forming a further WSTP instance (the master WSTP instance), so that a hierarchy of WSTP instances is formed. In the general case, to connect a number, N of WSTP instances, a master WSTP instance connects a single mesh point from each of the N spanning tree topologies of the N WSTP instances. Not all root mesh points of the WSTP instances need to be portals. Typically, at least one of the instances has a portal as the root mesh point of the tree topology of the SWTP instance. In one embodiment, the first root mesh point is also a portal In the hierarchical case, not all root mesh points of the WSTP instances need to be portals. Typically, at least one of the instances has a root mesh point that has an uplink. In one embodiment, the first root mesh point that is also a portal is the root mesh point of the master WSTP instance that connects the root mesh points of the N instances.

Referring to FIG. 4, in this example, there are three WSTPs running resulting in three wireless spanning tree topologies with root mesh points 211, 221, and 433, respectively. In addition, the root mesh points run a further WSTP instance that forms a master spanning tree topology. In this example, mesh point portal 211 forms the root mesh point of the master spanning tree topology.

Thus, as an example, suppose mesh 430 is mobile. When the root 433 of the third spanning tree topology that corresponds to the third WSTP instance that is running in the mesh points of mesh 430 comes close enough to be part of the master spanning tree topology, each mesh point in the mesh 430, e.g., mesh point 25 can route traffic to network 201 via a third mesh point topology of mesh 430, then by the master spanning tree topology, e.g., to the mesh point portal 211 that is the root of the master spanning tree topology. The mesh point portal 211 is coupled to the network 201 via the LAN segment 203.

Another aspect of the invention is applicable to running a plurality WSTP instances to define a plurality of corresponding wireless spanning tree topologies for a corresponding plurality of meshes, with two or more meshes each having a portal to a network. This aspect provides for a mesh point of one of the plurality of meshes the ability of load balancing when the mesh of that mesh point has one or more mesh points coupled to at least two mesh point portals.

Figure 5:
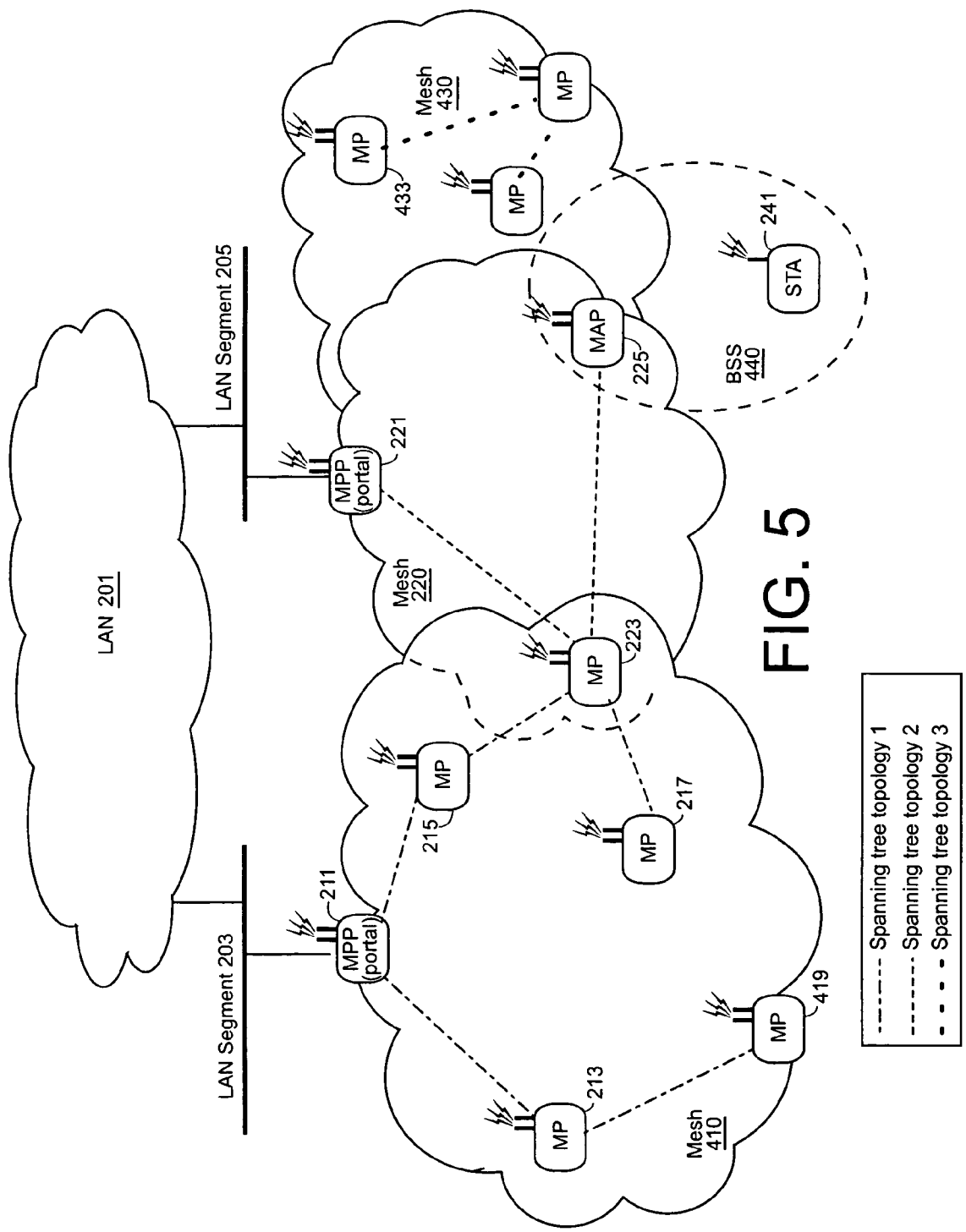
FIG. 5 again shows a simplified example of a plurality of tree topologies and wireless meshes corresponding to running a plurality of WSTP instances, and illustrates how load balancing can be performed by a mesh point of more than one instance of WSTP that each includes a portal to a network.

Consider as an example the meshes shown in FIG. 5, and suppose a first mesh, mesh 410 is a fixed mesh and a second mesh, mesh 220 is a mobile mesh. Mesh 410 results from running a first WSTP instance that defines a first wireless spanning tree topology with the root mesh point being mesh point portal 211, while mesh 220 results from running a second WSTP instance that defines a second wireless spanning tree topology with the root mesh point being mesh point portal 221. Consider a particular mesh point of the second mesh 220, e.g., mesh point 223, and suppose, as shown, that mesh point 223 comes close enough to also become part of the first tree topology of the first WSTP instance. The mesh point 223 is now part of both spanning tree topologies and thus runs (at least two) instances of WSTP with the root mesh points of at least two tree topologies having an uplink to the network 201. An aspect of the present invention is that the mesh point 223 can perform load balancing between the first and second mesh point topologies. For example, if the mesh point 223 sees that the uplink at the mesh point portal 211 of the first mesh is superior to the uplink at the mesh point portal 221 of the second mesh 220, mesh point 223 routes traffic via the first mesh point portal 211 using the first instance WSTP. Thus, for example, suppose traffic is sent from a client station 241 of an AP 225 in a BSS 440, with AP 225 also being a mesh point of the second mesh 220. And suppose that the tree topology of mesh 220 is such that traffic is routed via mesh point 223 prior to arriving at the root mesh point 221 of the mesh 220. The traffic is routed by the mesh point 223 according to the uplink properties of the mesh point portals 211 and 221 to achieve load balancing.

Thus, described herein are different aspects of running multiple instances of the wireless spanning tree protocol (WSTP) that each substantially conforms to the standard IEEE 802.1 spanning tree protocol as defined in the WSTP Application. The implementations are described mostly as a method implemented in a wireless mesh point. Also described herein is a carrier medium that includes computer instructions that when executed by at least one processor of a processing system, cause the processor(s) to carry out the method. Also described herein is a wireless mesh point that carries out the method, e.g., that runs multiple WSTP instances.

Much of the above description is terms of the control/ management frames that encapsulate the BPDU information being beacons and probe response frames that encapsulate the BPDU information. Those in the art will understand that the invention is applicable to encapsulating the BPDU information in other control/management frames. How to modify the details described herein to accommodate encapsulating BPDU information in other control/management frames will be clear and straightforward to those in the art.

The methodologies described herein are, in one embodiment, performable by a machine which includes a one or more processors that accept and execute instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments, (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In the embodiments described above, the machine is in a wireless mesh point. In alternative embodiments, the machine also can operates as a standalone device and may be connected, e.g., networked to other machines. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of wireless mesh point. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium, e.g., a computer program product on a computer-readable storage medium carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media, e.g., a centralized or distributed database, and/or associated caches and servers that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a system that uses packets other than IEEE 802.11 packets, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, bluetooth, GSM, PHS, CDMA, and other cellular wireless telephony standards.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first mesh point of a mesh of wireless mesh points (a "wireless mesh network") in a wireless network, the method comprising:

establishing and/or maintaining, in collaboration with other wireless mesh points, a plurality of wireless spanning tree topologies in the wireless mesh network, the wireless mesh network substantially conforming to a wireless network standard, the wireless network standard providing a mechanism for a wireless network entity to wirelessly communicate with other wireless network entities using control/management frames for the exchange of wireless network information, the establishing and/or maintaining by running a respective plurality of instances ("WSTP instances") of a wireless spanning tree protocol that substantially conforms to a standard IEEE 802.1 spanning tree protocol, each WSTP instance defining a corresponding wireless spanning tree topology including a corresponding root wireless mesh point, wherein running a WSTP instance in the first wireless mesh point includes:

maintaining information on the spanning tree topology corresponding to the WSTP instance, the corresponding spanning tree topology being for a corresponding set of wireless mesh points that includes the first wireless mesh point, the corresponding spanning tree topology being for wirelessly communicating among the corresponding set of wireless mesh points, the maintained information including the identity of the corresponding root wireless mesh point for the corresponding spanning tree topology;

wirelessly sending a control/management frame including an indication that path cost information is encapsulated the control/management frame with the indication encapsulating the path cost information in the form of at least one path cost information element, and as a result of receiving a control/management frame, ascertaining if the received control/management frame encapsulate path cost information, and if there is encapsulated path cost information, updating the maintained information on the corresponding spanning tree topology, and accordingly modifying any path cost information element for sending in a path-cost-information-encapsulating control/management frame, wherein each root wireless mesh point is not required to have a wired network interface, and wherein each path cost information element includes a path cost designed for wireless communication that has more than one possible value between two mesh points that are connectable, and that may include a bridging protocol data unit ("BPDU") that substantially conforms to a standard IEEE 802.1 spanning tree protocol BPDU, but with a path cost different than a standard IEEE 802.1 spanning tree protocol BPDU path cost in that the path cost is designed for wireless communication and has more than one possible value between two mesh points that are connectable.

2. A method as recited in claim 1, wherein the control/management frames include beacon and probe response frames, such that the wireless network standard provides a mechanism for wireless network entities to wirelessly transmit beacon or probe response frames to other wireless network entities to advertise the radio characteristics of the wireless network entity, such that in the running of a WSTP instance in a particular wireless mesh point, the wirelessly sending a control/management frame includes wirelessly sending a beacon frame and, in the case a probe request frame was received that includes a bridging information request, a probe response frame, the beacon and probe response frame including an indication that path cost information is encapsulated, and that further encapsulates at least one path information element that substantially conforms to IEEE standard 802.1 spanning tree protocol BPDU information, but with a path cost that can take on multiple values between two mesh points that are connectable and that is calculated according to wireless information, and such that in the running of a WSTP instance in a particular wireless mesh point, as a result of receiving a beacon frame or probe response frame, ascertaining if the received beacon or probe response frame encapsulate path cost information, and if there is encapsulated path cost information, updating the maintained information on the corresponding spanning tree topology, and accordingly modifying any path cost information for sending in a path cost information-encapsulating beacon frame and probe response frame.

3. A method as recited in claim 2, wherein the maintained information includes a unique identifier for the corresponding spanning tree topology, and wherein the path cost information includes an indication of the identity of the spanning tree topology.

4. A method as recited in claim 2, wherein the root mesh point of at least one of the spanning tree topologies corresponding to the WSTP instances has an uplink to a first wired network.

5. A method as recited in claim 2, wherein the first wireless mesh point has an uplink to a first wired network.

6. A method as recited in claim 2, wherein at least two of the spanning tree topologies corresponding to the WSTP instances have the same root tree mesh point.

7. A method as recited in claim 6, wherein the first wireless mesh point is the root mesh point of the spanning tree topologies of the WSTP instances that have the same root tree mesh point.

8. A method as recited in claim 7, wherein first wireless mesh point has an uplink to a first wired network.

9. A method as recited in claim 6, wherein the root mesh point of the spanning tree topologies of the WSTP instances that have the same root tree mesh point has an uplink to a first wired network.

10. A method as recited in claim 6,
wherein each of the WSTP instances that have the same root tree mesh point uses a different path cost criterion designed for wireless communication that can take on multiple values for a wireless link between two wireless mesh points that are connectable.

11. A method as recited in claim 10, wherein the different path cost criteria are selected so that traffic is wirelessly transported between mesh points via different ones of the wireless spanning tree topologies of the WSTP instances that have the same root tree mesh point with different qualities of service (QoS).

12. A method as recited in claim 6, wherein traffic in the wireless network includes traffic for a plurality of virtual local area networks ("VLANs"), with one VLAN per spanning tree topology of the WSTP instances that have the same root tree mesh point.

13. A method as recited in claim 12, including trunking using one of the set of trunking mechanisms consisting of Inter-Switch Link (ISL) trunking and IEEE 802.1Q trunking.

14. A method as recited in claim 6, wherein traffic is classified into one of a pre-defined set of different classes according to a classification mechanism, wherein a different VLAN is used for each traffic class such that there is one respective WSTP instance of the WSTP instances that have the same root mesh point for each class, with a corresponding spanning tree topology for each class.

15. A method as recited in claim 14, wherein each of WSTP instances uses a distinct respective path cost criterion applicable to the traffic class.

16. A method as recited in claim 14, wherein traffic is classified using one of a subset of the IEEE 802.11e set of classes consisting of Voice, Video, Best Effort, and Background, and wherein the first wireless mesh point runs a respective instance of the WSTP for each class, such that the first wireless mesh point runs at most four instances of the WSTP with the same root mesh point for each of the at most four wireless spanning tree topologies corresponding to the at most four WSTP instances.

17. A method as recited in claim 16, wherein there is one VLAN per class.

18. A method as recited in claim 14, wherein the classification mechanism uses Resource ReSerVation Protocol (RSVP).

19. A method as recited in claim 14, wherein the GARP VLAN Registration Protocol ("GVRP") is used to selectively choose on which VLAN wireless mesh points receive multicast traffic from their respective parents recursively until the root mesh point of the plurality of WSTP instances that have the same root mesh point is reached, such that different classes of multicast traffic are routed via the respective tree topologies of different WSTP instances.

20. A method as recited in claim 6, wherein each Bridge Protocol Data Unit (BPDU) in BPDU information includes an information element that indicates the quality of service (QoS).

21. A method as recited in claim 20, wherein traffic is classified into one of a pre-defined set of different classes according to a classification mechanism, and wherein the first wireless mesh point runs one respective WSTP instance of the WSTP instances that have the same root mesh point for each class, with a corresponding spanning tree topology for each class.

22. A method as recited in claim 21, wherein in addition to the indication of the class in the BPDU information, the path cost information includes an indication of the available admission capacity.

23. A method as recited in claim 22, wherein the path cost information includes an indication of path cost, and wherein the path cost calculated for a link uses the indication of the available admission capacity, the path cost calculated for a link taking one of a plurality of possible values for a link between two wireless mesh points that are connectable.

24. A method as recited in claim 1, wherein at least two root mesh points of at least two of the spanning tree topologies corresponding to the WSTP instances are different.

25. A method as recited in claim 24, wherein the distinct root mesh points of the at least two spanning tree topologies form a mesh of root mesh points as a result of the distinct root mesh points running a master WSTP instance forming a master wireless spanning tree topology, with one of the distinct root mesh points of the at least two spanning tree topologies forming the root mesh point of the master wireless spanning tree topology, such that a hierarchy of WSTP instances is run.

26. A method as recited in claim 24, wherein the at least two distinct root mesh points of the at least two of the spanning tree topologies corresponding to the WSTP instances have uplinks to a first wired network, the method further comprising:
  for traffic addressed to an address in the first wired network or beyond, performing load balancing including routing traffic to different root mesh points that have an uplink.

27. A method as recited in claim 26, wherein the load balancing includes routing traffic to different root mesh points that have an uplink according to properties of the respective uplinks.

28. A first wireless mesh point as recited in claim 1, wherein the wireless standard is the IEEE 802.11 wireless LAN standard.

29. A method as recited in claim 1, further comprising, for each WSTP instance, as a result of wirelessly receiving one or more beacon frames from one or more other wireless mesh points of the network, the received beacon frames encapsulating path cost information for the WSTP instance, using the encapsulated path cost information of the instance received in the beacon frames from the other wireless mesh points to discover the next other wireless mesh point in the best path to the root wireless mesh point of the spanning tree topology for that WSTP instance prior to establishing a forwarding radio link with the next other wireless mesh point.

30. A method as recited in claim 1, wherein the encapsulated path cost information for each WSTP instance includes one or more radio parameters for path cost calculation for the path cost between a receiving wireless mesh point and other wireless mesh points for that WSTP instance.

31. A method as recited in claim 30, wherein the path cost for determining the spanning tree topology is a weighted sum of at least two of the included radio parameters.

32. A method as recited in claim 31, wherein the one or more included radio parameters include one or more of the received signal strength, the available transmission power, a measure of mobility of the first wireless mesh point, and a hop count.

33. A method as recited in claim 30, farther comprising, for each WSTP instance:
  wirelessly receiving one or more beacon frames or probe response frames from one or more other wireless mesh points of the network, the received beacon or probe response frames encapsulating BPDU information including path costs for that WSTP instance; and
  storing as part of the maintained information for the WSTP instance, path costs of encapsulating BPDU information received from other wireless mesh points.

34. A method as recited in claim 30, farther comprising, for each WSTP instance:
  storing as part of the maintained information for the WSTP instance, radio path costs for alternate and/or backup links to links in the spanning tree topology for the WSTP instance.

35. A method as recited in claim 2, further comprising, for each WSTP instance:
  storing information on dormant alternate and/or backup links for the tree topology of the WSTP instance with other wireless mesh points, the information being part of the maintained information for the corresponding spanning tree topology;
  ascertaining whether or not there is a need to use an alternate and/or backup link; and
  upon ascertaining the need for a dormant alternate and/or backup link, activating one or more of the dormant alternate and/or backup links according to the stored information.

36. A first wireless mesh point comprising:
  a radio transceiver;
  a wireless MAC protocol processor coupled to the radio transceiver, such that the radio transceiver and MAC protocol processor combination is able to wirelessly send and receive frames substantially conforming to a wireless network standard; and
  a wireless spanning tree protocol processor coupled to the radio transceiver and configured to:
  establish a plurality of active spanning tree topologies in a wireless mesh network of a plurality of mesh points, the wireless mesh network substantially conforming to the wireless network standard, the wireless network standard providing a mechanism for a wireless network entity to wirelessly communicate with other wireless network entities using control/management frames for the exchange of wireless network information, the first wireless mesh point, and
  maintain information on each topology, each topology specifying the communication pathways between wireless mesh points in the wireless network, each spanning tree topology having a root mesh point, the maintained information including the identity of the root mesh point each topology determined according to a spanning tree protocol that substantially conforms to a standard IEEE 802.1 spanning tree protocol but with a path cost different than a standard IEEE 802.1 spanning tree protocol path cost in that the wireless spanning tree protocol path cost measure is designed for wireless communication and has one of a plurality of possible values for a path between two mesh points that are connectable, wherein each root wireless mesh point is not required to have a wired network interface, wherein the establishing of each spanning tree protocol of the plurality includes receiving spanning tree protocol capabilities from other wireless mesh points in control/management frames that encapsulate path cost information as one or more path cost information elements that may include bridge protocol data units ("BPDUs"), the path cost information announcing the spanning tree protocol capabilities of the first wireless mesh point for the topology by transmitting control/management frames that encapsulate path cost information as one or more path cost information elements for the topology, wherein each path cost information element includes the path cost measure designed that has one of a plurality of possible values for a path between two mesh points that are connectable, and wherein any BPDUs included in the one or more path cost information elements substantially conform to standard IEEE 802.1 spanning tree protocol BPDUs, but with a path cost different than a standard IEEE 802.1 spanning tree protocol BPDU path cost in that the path cost is designed for wireless communication and has one of a plurality of possible values for a path between two mesh points that are connectable.

37. A first mesh point as recited in claim 36, wherein the control/management frames include beacon and probe response frames, and wherein the wireless network standard provides a mechanism for wireless network entities to wirelessly transmit beacon or probe response frames to other wireless network entities to advertise the radio characteristics of the wireless network entity, such that the establishing of each spanning tree protocol of the plurality includes receiving spanning tree protocol capabilities from other wireless mesh nodes in beacon and probe response frames that encapsulate path cost information as at least one path cost information element, and announcing the spanning tree protocol capabilities of the first wireless mesh point for the topology by transmitting beacon frames or probe response frames that encapsulate path cost information as at least one path cost information element for the topology.

38. A first mesh point as recited in claim 37, wherein the maintained information for each spanning tree topology includes a unique identifier for the corresponding spanning tree topology.

39. A first mesh point as recited in claim 37, wherein the path cost information for a spanning tree topology of the plurality of topologies includes an indication of the identity of the spanning tree topology.

40. A first mesh point as recited in claim 37, further comprising:

a network interface to a wired network.

41. A first mesh point as recited in claim 37, wherein at least two of the spanning tree topologies have the same root tree mesh point.

42. A first mesh point as recited in claim 41, wherein traffic is classified into one of a pre-defined set of different classes according to a classification mechanism, such that there is one respective spanning tree topology that has the same root mesh point for each class.

43. A first mesh point as recited in claim 42, wherein each of the respective spanning tree topology is determined using a distinct respective path cost criterion applicable to the traffic class.

44. A first mesh point as recited in claim 37, wherein at least two root mesh points of at least two of the spanning tree topologies are different.

45. An apparatus in a first wireless mesh point, the apparatus comprising:

means for establishing and/or maintaining, in collaboration with other wireless mesh points, multiple instances of a spanning tree protocol ("WSTP instances") in a wireless mesh network that includes the first wireless mesh point and the other wireless mesh points, the wireless mesh network conforming to a wireless network standard, each spanning tree protocol instance substantially conforming to a standard IEEE 802.1 spanning tree protocol, the wireless network including the first wireless mesh point and at least two other wireless mesh points, the wireless network standard providing a mechanism for a wireless network entity to wirelessly communicate with other wireless network entities using control/management frames for the exchange of wireless network information, the means for establishing and/or maintaining comprising:

means for maintaining information in the first wireless mesh point on a plurality of spanning tree topologies each determined according to a spanning tree protocol that substantially conforms to a standard IEEE 802.1 spanning tree protocol using a wireless network path cost measure that can have a plurality of values for a path between two mesh points that are connectable, the maintained information for a topology including maintaining the identity of a root wireless mesh point of the spanning tree topology; and means for wirelessly transmitting bridging path cost information information for each topology as at least one path cost information element that may includes one or more bridge protocol data units ("BPDUs") for the topology to other wireless mesh points of the network encapsulated in one or more control/management frames, wherein the root wireless mesh point is not required to have a wired network interface, and wherein the BPDUs substantially conforms to BPDUs according to the standard IEEE 802.1 spanning tree protocol, but with a path cost different than a standard IEEE 802.1 spanning tree protocol BPDU path cost in that the path cost is designed for wireless communication and has one of a plurality of possible values for a path between two mesh points that are connectable.

46. An apparatus as recited in claim 45, wherein the control/management frames include beacon and probe response frames, and wherein the wireless network standard provides a mechanism for wireless network entities to wirelessly transmit beacon or probe response frames to other wireless network entities to advertise the radio characteristics of the wireless network entity, such that the means for wirelessly transmitting path cost information transmits the path cost information as path cost information elements for the topology in one or more beacon or probe response frames.

47. An apparatus as recited in claim 45, wherein the path cost information includes an indication of the identity of the spanning tree topology of the plurality of topologies.

48. An apparatus as recited in claim 45, wherein a beacon or probe response frame from the first wireless mesh point includes an indication of whether or not BPDU path cost information is included.

49. An apparatus as recited in claim 45, further comprising: means for interfacing to a wired network.

50. An apparatus as recited in claim 45, wherein at least two of the spanning tree topologies have the same root tree mesh point.

51. An apparatus as recited in claim 50, wherein traffic is classified into one of a pre-defined set of different classes according to a classification mechanism, such that there is one respective WSTP instance of the WSTP instances that have the same root mesh point for each class, with a corresponding spanning tree topology for each class.

52. An apparatus as recited in claim 51, wherein each of WSTP instances uses a distinct respective path cost criterion applicable to the traffic class.

53. An apparatus as recited in claim 45, wherein at least two root mesh points of at least two of the spanning tree topologies corresponding to the WSTP instances are different.

54. A computer readable storage medium configured with computer readable code that when executed by a processor of a processing system in a first wireless mesh point to cause the first wireless mesh point to carry out a method, the processing system and the computer readable storage medium a first wireless mesh point, the computer readable storage medium configured with:

code to cause establishing and/or maintaining, in collaboration with other wireless mesh nodes, multiple spanning tree topologies in a multi-hop wireless mesh network, each spanning tree topology according to a respective instance of a spanning tree protocol ("WSTP instances") for a wireless mesh network, such that each WSTP instance substantially conforms to the standard IEEE 802.1 spanning tree protocol, the wireless network conforming to a wireless network standard, the wireless network including the first wireless mesh point and at least two other wireless mesh points, the first wireless mesh point including a transceiver coupled to the processor and configured to wirelessly transmit and receive frames, the wireless network standard providing a mechanism for a wireless network entity to wirelessly communicate with other wireless network entities using control/management frames for the exchange of wireless network information, the code to cause establishing and/or maintaining comprising:

code to cause the processor to maintain information in the first wireless mesh point on the plurality of spanning tree topologies determined according to the spanning tree protocol that substantially conforms to a standard IEEE 802.1 spanning tree protocol, but that uses a wireless network path cost measure that is designed for wireless communication and that has one of a plurality of values for a path between two connectable wireless mesh points, the maintained information for a topology including maintaining the identity of a root wireless mesh point of the spanning tree topology; and code to cause the transceiver to wirelessly transmit path cost information for each topology as one or mote path cost information elements that may include bridge protocol data units ("BPDUs") for the topology, the transmitting to other wireless mesh points of the network, the path cost information encapsulated in one or more control/management frames, wherein each root wireless mesh point is not required to have a wired network interface, wherein each path cost information element includes the path cost measure designed that has one of a plurality of possible values for a path between two mesh points that are connectable, and wherein a BPDU substantially conforms to a standard IEEE 802.1 spanning tree protocol BPDU but with a path cost different than a standard IEEE 802.1 spanning tree protocol BPDU path cost in that the path cost is designed for wireless communication and has one of a plurality of possible values for a path between two mesh points that are connectable.

55. A computer readable storage medium as recited in claim 54, wherein the control/management frames include beacon and probe response frames, and wherein the wireless network standard provides a mechanism for wireless network entities to wirelessly transmit beacon or probe response frames to other wireless network entities to advertise the radio characteristics of the wireless network entity, such that the code to wirelessly transmit BPDU information causes transmitting BPDUs encapsulated in one or more beacon and probe response frames.

56. A computer readable storage medium as recited in claim 54, wherein the BPDU information includes an indication of the identity of the spanning tree topology of the plurality of topologies.

57. A computer readable storage medium as recited in claim 54, wherein a beacon or probe response frame from the first wireless mesh point includes an indication of whether or not BPDU information is included.

58. A computer readable storage medium as recited in claim 54, wherein at least two of the spanning tree topologies have the same root tree mesh point.

59. A computer readable storage medium as recited in claim 58, wherein traffic is classified into one of a pre-defined set of different classes according to a classification mechanism, wherein a different VLAN is used for each traffic class such that there is one respective WSTP instance of the WSTP instances that have the same root mesh point for each class, with a corresponding spanning tree topology for each class.

60. A computer readable storage medium as recited in claim 59, wherein each of the WSTP instances uses a distinct respective path cost criterion applicable to the traffic class.

61. A computer readable storage medium as recited in claim 54, wherein at least two root mesh points of at least two of the spanning tree topologies corresponding to the WSTP instances are different.

\* \* \* \* \*

UNITED STATES PATENT AND TRADEMARK OFFICE
CERTIFICATE OF CORRECTION

PATENT NO. : 7,606,178 B2  Page 1 of 1
APPLICATION NO. : 11/351853
DATED : October 20, 2009
INVENTOR(S) : Rahman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this

Fifth Day of October, 2010

David J. Kappos
*Director of the United States Patent and Trademark Office*